US009220976B2

(12) United States Patent
Oku

(10) Patent No.: US 9,220,976 B2
(45) Date of Patent: Dec. 29, 2015

(54) STORAGE MEDIUM STORING GAME PROGRAM, AND GAME DEVICE

(75) Inventor: Masahiro Oku, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 611 days.

(21) Appl. No.: 12/550,714

(22) Filed: Aug. 31, 2009

(65) Prior Publication Data

US 2010/0160050 A1   Jun. 24, 2010

(30) Foreign Application Priority Data

Dec. 22, 2008   (JP) ................................. 2008-326209

(51) Int. Cl.
*A63F 13/40* (2014.01)

(52) U.S. Cl.
CPC ......... *A63F 13/10* (2013.01); *A63F 2300/1093* (2013.01); *A63F 2300/204* (2013.01); *A63F 2300/6045* (2013.01); *A63F 2300/6692* (2013.01); *A63F 2300/69* (2013.01); *A63F 2300/8094* (2013.01)

(58) Field of Classification Search
CPC ................ A63F 13/10; A63F 2300/69; A63F 2300/1093; A63F 2300/6045; A63F 2300/6692; A63F 2300/8094; A63F 2300/204
USPC .......................................................... 463/43
See application file for complete search history.

(56) References Cited

U.S. PATENT DOCUMENTS

| | | | | |
|---|---|---|---|---|
| 5,781,198 A * | 7/1998 | Korn | ............................. | 345/634 |
| 6,183,367 B1 * | 2/2001 | Kaji et al. | ...................... | 463/42 |
| 6,227,974 B1 * | 5/2001 | Eilat et al. | ....................... | 463/40 |
| 6,280,323 B1 | 8/2001 | Yamazaki et al. | | |
| 6,677,967 B2 * | 1/2004 | Sawano et al. | ................ | 715/839 |
| 6,890,262 B2 * | 5/2005 | Oishi et al. | ....................... | 463/31 |
| 7,053,915 B1 * | 5/2006 | Jung et al. | ..................... | 345/633 |
| 7,401,783 B2 * | 7/2008 | Pryor | ............................ | 273/237 |
| 7,522,752 B2 * | 4/2009 | Adachi et al. | ................. | 382/118 |
| 7,640,164 B2 * | 12/2009 | Sasaki et al. | .................. | 704/272 |
| 7,698,238 B2 * | 4/2010 | Barletta et al. | .................. | 706/16 |
| 7,713,129 B2 * | 5/2010 | Yamada et al. | ................ | 463/44 |
| 8,047,915 B2 * | 11/2011 | Lyle et al. | ....................... | 463/31 |
| 2002/0082082 A1 * | 6/2002 | Stamper et al. | ................ | 463/32 |
| 2002/0097247 A1 | 7/2002 | Ohba | | |

(Continued)

FOREIGN PATENT DOCUMENTS

| | | |
|---|---|---|
| JP | 9-168647 | 6/1997 |
| JP | 2000-149041 | 5/2000 |

(Continued)

OTHER PUBLICATIONS

EyeToy Play2 User's Manual, Copyright 2004.*

(Continued)

*Primary Examiner* — Michael Grant
(74) *Attorney, Agent, or Firm* — Nixon & Vanderhye, P.C.

(57) ABSTRACT

A processor repeatedly executes, at a predetermined cycle, obtaining image data by an inner camera and body recognition processing based on the obtained image data. The processor proceeds with a game based on a recognition result (user's image) obtained (updated) periodically. The processor captures image data at the timing of the recognition result (user's image) satisfying each of conditions 1, 2, . . . during the game proceeding. After the game is over, image data 1, 2, . . . captured during game play is displayed (replayed).

28 Claims, 29 Drawing Sheets

(56) References Cited

U.S. PATENT DOCUMENTS

| | | | |
|---|---|---|---|
| 2003/0003992 A1* | 1/2003 | Furuya | 463/36 |
| 2003/0130035 A1* | 7/2003 | Kanarat | 463/31 |
| 2005/0064926 A1* | 3/2005 | Walker et al. | 463/16 |
| 2005/0190188 A1* | 9/2005 | Anzawa et al. | 345/474 |
| 2006/0046846 A1* | 3/2006 | Hashimoto | 463/36 |
| 2006/0160616 A1* | 7/2006 | Kato et al. | 463/30 |
| 2007/0126874 A1 | 6/2007 | Kake | |
| 2007/0189583 A1* | 8/2007 | Shimada et al. | 382/118 |
| 2007/0260984 A1* | 11/2007 | Marks et al. | 715/706 |
| 2008/0001951 A1* | 1/2008 | Marks et al. | 345/474 |
| 2008/0030459 A1 | 2/2008 | Kouno | |
| 2009/0042654 A1* | 2/2009 | Barber | 463/42 |
| 2009/0082095 A1* | 3/2009 | Walker et al. | 463/25 |
| 2010/0160049 A1* | 6/2010 | Oku | 463/43 |

FOREIGN PATENT DOCUMENTS

| | | |
|---|---|---|
| JP | 2000-197775 | 7/2000 |
| JP | 2001-307124 | 11/2001 |
| JP | 2002-157079 | 5/2002 |
| JP | 2002-196855 | 7/2002 |
| JP | 2003-085571 | 3/2003 |
| JP | 2003-117239 | 4/2003 |
| JP | 2006-006853 | 1/2006 |
| JP | 2006-014875 | 1/2006 |
| JP | 2006-190091 | 7/2006 |
| JP | 2006-293999 | 10/2006 |
| JP | 2007-151647 | 6/2007 |
| WO | 2006/098255 | 9/2006 |

OTHER PUBLICATIONS

YouTube video "Eye Toy Play 2 for Playstation 2 Monkey Bars", https://www.youtube.com/watch?v=9vi30W05LZo, published Dec. 8, 2014.*

"The Manual of "Otona no DS Kao Training (Face Training for Adults)" of Nintendo," Nintendo Col, Ltd., 2007, 6 Pages.

Japanese Office Action issued for corresponding Japanese Patent Application No. 2008-326209, dated Aug. 21, 2012.

Japanese Office Action issued for corresponding Japanese Patent Application No. 2008-326209, dated May 22, 2012.

* cited by examiner

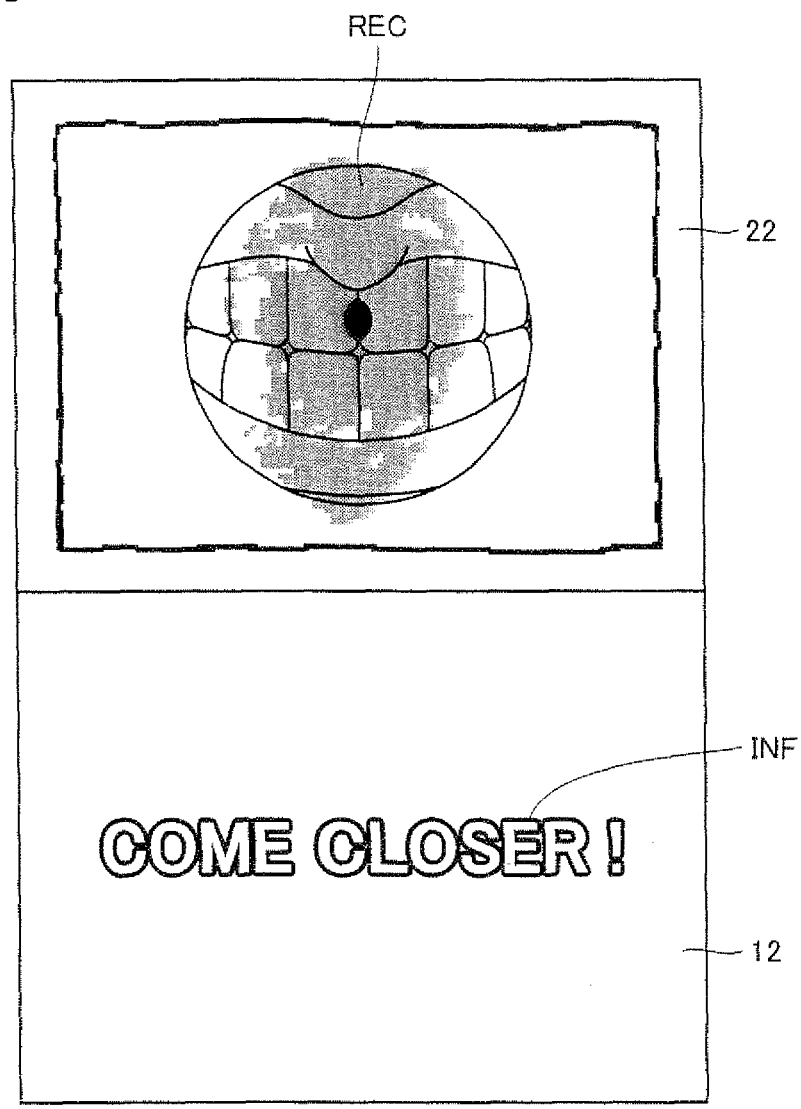

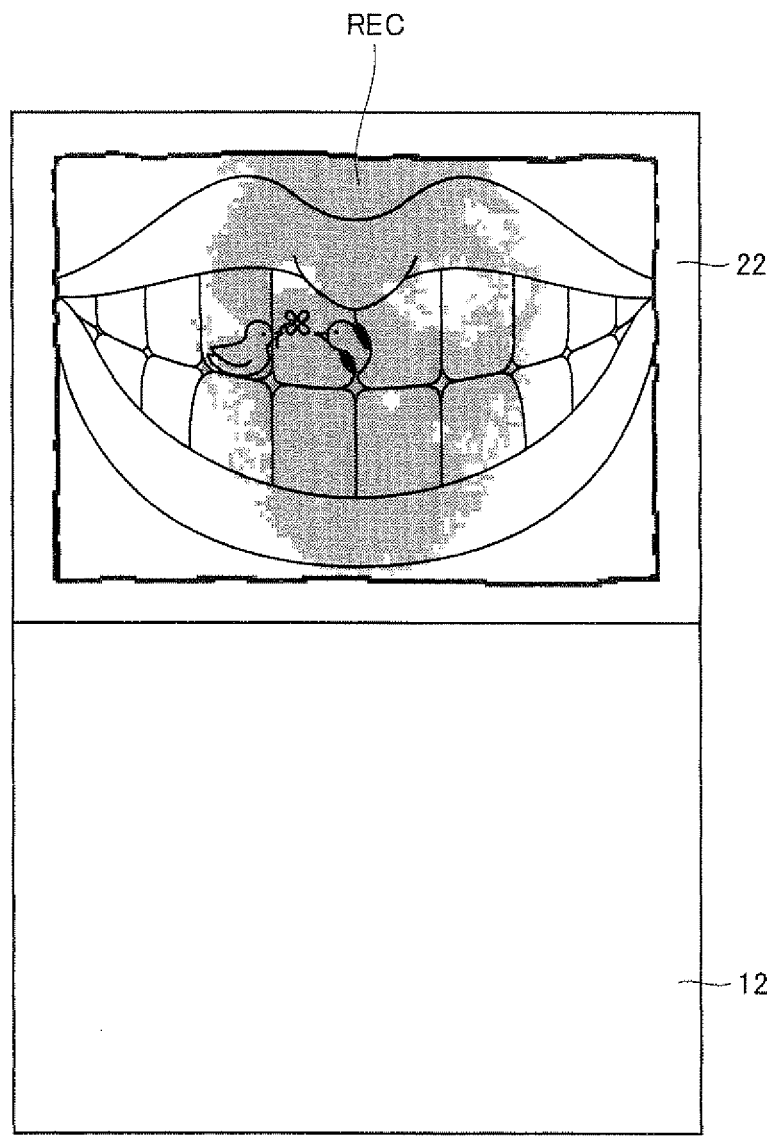

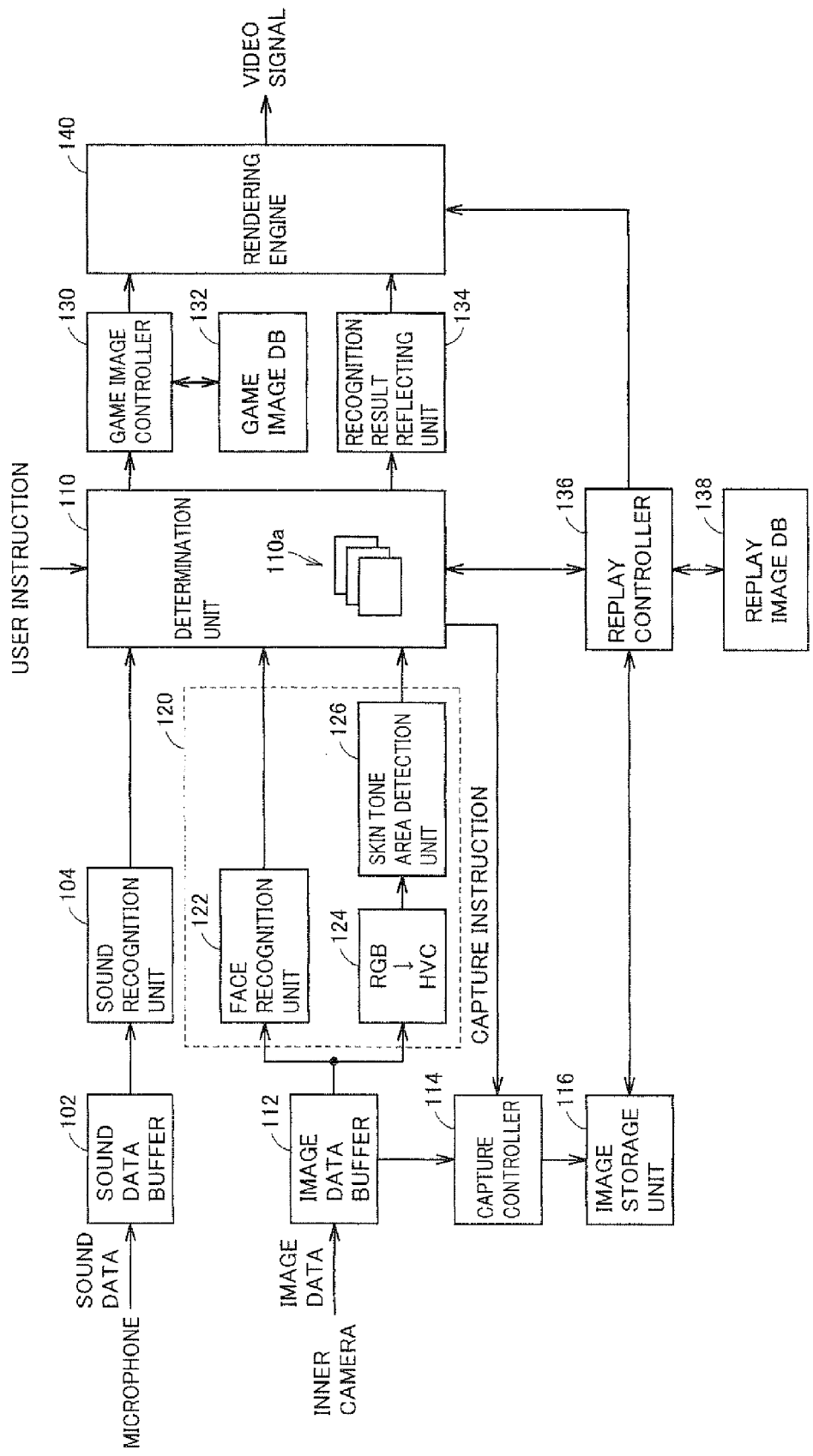

STORAGE MEDIUM STORING GAME PROGRAM, AND GAME DEVICE

This nonprovisional application is based on Japanese Patent Application No. 2008-326209 filed on Dec. 22, 2008 with the Japan Patent Office, the entire contents of which are hereby incorporated by reference.

BACKGROUND OF THE INVENTION

1. Field of the Invention

The present invention relates to a storage medium storing a game program that allows a game to proceed based on image data obtained by taking a picture of a user, and a game device.

2. Description of the Background Art

A game program for taking a picture of a user's face and running a game based on image data obtained by the image pickup is conventionally known (for example, refer to the manual of "Otona no DS Kao Training (Face Training for Adults)" of Nintendo). According to this game program, an image of a user is taken at a timing corresponding to a predetermined elapse from the start of the game, and the taken image of the user is presented on the display together with the results of the game when the game is over.

The conventional art set forth above allows a picture of the user to be taken only at a timing corresponding to a predetermined elapse from the start of the game, and only the user's facial expression corresponding to that timing was displayed when the game was over.

SUMMARY OF THE INVENTION

An object of the present invention is to provide a storage medium storing a game program causing a game to proceed based on image data obtained by picking up an image of a user, and displaying a facial expression or the like of the user in the act of playing the game, and a game device.

According to a first aspect of the present invention, there is provided a storage medium storing a game program executed by a computer of a game device (100) interacting with an image pick-up device (23: corresponding to the reference numeral used in embodiments; the same applies hereinafter) and a display device (12, 22). The image pick-up device is adapted to pick up an image of a user (player). The game, program includes game proceeding instructions (110, 120, 130, 132) for a game to proceed based on a user's image included in image data obtained by the image pick-up device, and display control instructions (136) for displaying an image based on image data at the display device. The image data is obtained by the image pick-up device when the user's image satisfies at least a predetermined condition.

According to the first aspect, there can be obtained image data of an appearance of a user taken at a certain timing in the act of playing a game presented by the present game program. Namely, a picture of the user in the act of playing a game can be taken at the timing when the user's image included in the image data obtained by picking up an image of the user has satisfied a predetermined condition. By displaying these image data when the game is over, one can enjoy looking at the user's unexpected and/or amusing facial expression of the user in the act of playing the game. The "user's image" implies an image including the area where the user appears as a photographic subject among the image data obtained by the image pick-up device.

According to a preferable second aspect of the present invention, the display control instructions include instructions for displaying an image based on image data at the display device during a non-proceeding state of the game in accordance with the game proceeding instructions. The image data is obtained by the image pick-up device when the user's image satisfies at least a predetermined condition.

According to the second aspect, one can enjoy looking at, during a period over which the user is not playing the game, an unexpected and/or amusing facial expression of the user in the act of playing a game.

According to a preferable third aspect, the display control instructions include instructions for displaying an image based on image data at the display device after the game is over. The image data is obtained by the image pick-up device when the user's image satisfies at least a predetermined condition.

According to the third aspect, one can enjoy looking at an unexpected and/or amusing facial expression of the user in the act of playing a game, after the game ends.

According to a preferable fourth aspect, the game proceeding instructions include instructions for determining whether a game has attained passing or not based on the user's image. The display control instructions include instructions for displaying an image based on image data at the display device. The image data is obtained by the image pick-up device when determination is made that at least the game has attained passing.

According to the fourth aspect, an image of the facial expression and the like of the user around the timing of passing the game can be picked up. Accordingly, the facial expression or the like of the user when the game has attained passing can be displayed.

According to a preferable fifth aspect, the game proceeding instructions include instructions for determining whether the game has attained passing or not based on the position of the user's image and the position of an object displayed as a game effect.

According to the fifth aspect, an image of the facial expression or the like of the user around the timing of passing the game can be picked up. Therefore, the facial expression or the like of the user at the time of passing the game can be displayed after the game ends.

Since it is expected that the face, hands or the like of the user is most probably located at a position corresponding to a relevant passing condition, when the passing condition associated with the position of an object displayed in line with the game effect has been satisfied, image data of substantially a similar configuration can be obtained regardless of who has played the game. Accordingly, when the image data is displayed with a prepared image object or the like overlaid, the content intended by the creator can be represented more reliably.

According to a preferable sixth aspect, the game program further includes detection instructions (126) for detecting a user's area indicating an area of a user within image data, as the user's image. The game proceeding instructions include instructions for determining whether the game has attained passing or not based on the position of an object displayed as a game effect and the position of the user's area detected by executing the detection instructions.

According to the sixth aspect, an erroneous detection of a subject other than the user can be prevented since the area corresponding to the user can be properly identified.

According to a preferable seventh aspect, the detection instructions include instructions for detecting a user's area for each image data obtained repeatedly for every predetermined cycle by the image pick-up device. The game program further includes recognition result reflecting instructions for displaying a user's area detected during game proceeding by executing the detection instructions.

According to a preferable eighth aspect, the recognition result reflecting instructions include instructions for displaying a user's area in a manner different from the image picked up by the image pick-up device.

According to the seventh and eighth aspects, the user's facial expression obtained by the image pick-up device is not displayed during a period over which the user is playing the game. Therefore, the user can continue playing the game without having to be conscious of being taken a picture. As a result, image data corresponding to a natural facial expression of the user in the act of playing a game can be obtained.

According to a preferable ninth aspect, the detection instructions include skin tone area detection instructions for detecting a skin tone area in the image data. The game proceeding instructions include instructions for determining whether the game has attained passing or not based on the position of an object displayed as a game effect, and the position of the skin tone area detected by executing the skin tone area detection instructions.

According to the ninth aspect, an erroneous detection of a subject other than the user can be prevented since determination that the image pick-up device is taking an image of the user's skin can be made more reliably.

According to a preferable tenth aspect, the skin tone area detection instructions include instructions for detecting a skin tone area for each image data obtained repeatedly for every predetermined cycle by the image pick-up device. The game program further includes recognition result reflecting instructions for displaying a skin tone area detected during game proceeding by executing the skin tone area detection instructions.

According to the tenth aspect, the user can play the game while confirming the skin tone area detected from the image data obtained by picking up an image of the user.

According to a preferable eleventh aspect, the recognition result reflecting instructions include instructions for displaying a skin tone area in a manner different from the image picked up by the image pick-up device.

According to the eleventh aspect, the user can play the game without being conscious of a picture being taken since the facial expression or the like of the user obtained by the image pick-up device is not displayed during a period over which the user is playing the game. As a result, image data corresponding to a natural facial expression of the user in the act of playing the game can be obtained.

According to a preferable twelfth aspect, the game program further includes presence detection instructions for detecting the presence of a user. The game proceeding instructions include instructions for determining whether the game has attained passing or not during a period over which the user's presence is detected by executing the presence detection instructions.

According to the twelfth aspect, the event of the game being undesirably moving on due to an erroneous detection can be avoided in the case where the user is not present in front of the game device.

According to a preferable thirteenth aspect, the game program further includes face area detection instructions (122) for detecting a person's face area within the image data, as the user's image. The game proceeding instructions include instructions for determining whether the game has attained passing or not based on the position of an object displayed as a game effect and the position of a person's face area detected by executing the face area detection instructions.

According to the thirteenth embodiment, determination can be made more reliably that an image of a user's face is being picked up by the image pick-up device since a person's face area shall be identified. Accordingly, an erroneous detection of a subject other than the user can be prevented.

According to a preferable fourteenth aspect of the present invention, the display control instructions include instructions for storing image data every time any of a plurality of different conditions is satisfied, the conditions including a condition for determining that the relevant game has attained passing from the start to the end of the game, and instructions for displaying the stored plurality of image data in a manner switched in a predetermined sequence.

According to the fourteenth aspect, an image of a series of facial expressions and the like of the user in the act of playing a game can be picked up appropriately in addition to the image of a facial expression of the user around the time of passing the game. Therefore, after the game ends, the series of facial expressions of the user in the act of playing the game can be displayed in a manner like a motion picture. One can enjoy looking at an unexpected or amusing facial expression of the user.

According to a preferable fifteenth aspect, the display control instructions include instructions for displaying and overlaying a predetermined object on an image based on the image data obtained by the image pick-up device.

According to the fifteenth aspect, an object carrying any meaning is overlaid on the image data to be displayed, after the game is over. One can enjoy, not only the direct facial expression of the user in the act of playing a game, but also various expressions based on the user's facial expression.

According to a preferable sixteenth aspect, the display control instructions include instructions for overlaying and displaying an object corresponding to a game effect when image data was stored, on an image based on the relevant image data.

According to the sixteenth aspect, one can enjoy an image corresponding to replay of the game effect when the image data has been stored, after the game ends.

Alternatively, according to a preferable seventeenth aspect, the display control instructions include instructions for overlaying and displaying an object independent of the game effect when the image data was stored, on an image based on the relevant image data.

According to the seventeenth aspect, a representation with a completely different meaning can be presented using the facial expression of the user in the act of playing a game.

According to a preferable eighteenth aspect, the game program further includes object display instructions for displaying an object at the display device during game proceeding and during display of an image based on image data obtained by the image pick-up device. The object display instructions include instructions for displaying at a location identical to the location of an object that was displayed during game proceeding, another object replacing the displayed object, during display of an image based on image data obtained by the image pick-up device.

By displaying an object different from the object that was displayed during a game together with image data obtained during the game according to the eighteenth aspect, an image having a meaning different from the meaning applied to the object during the game can be displayed.

According to a preferable nineteenth aspect, the game program further includes object display instructions for displaying an object at a display device during game proceeding and during display of an image based on image data obtained by the image pick-up device. The object display instructions include instructions for displaying an object independent of the object displayed during game proceeding, during display of an image based on image data obtained by the image pick-up device.

By displaying an object not associated with the object that was displayed during a game, together with the image data obtained during the game, an image having a different meaning, not associated with the meaning applied to the object during the game, can be displayed.

According to a preferable twentieth aspect, the game proceeding instructions include instructions for a game to proceed by determining whether the game has attained passing or not based on a passing condition associated with each phase, at a predetermined number of multiple phases. The game program further includes object display instructions for switching and displaying, at the display device, an object associated with a passing condition corresponding to each phase according to the game proceeding.

According to a twentieth aspect, a plurality of objects having various meanings can be displayed as needed according to the game proceeding.

According to a preferable twenty-first aspect, the game proceeding instructions include instructions for a game to proceed by determining whether the game has attained passing or not based on a passing condition corresponding to each phase, at a predetermined number of multiple phases. The display control instructions include instructions for displaying a synthesized image based on a plurality of image data obtained by the image pick-up device at each of multiple phases during game proceeding, and an object associated with a passing condition corresponding to a phase at which the image data was obtained.

According to the twenty-first aspect, a representation can be provided, having objects according to each situation at which each image data has been obtained, added to a plurality of image data corresponding to an appearance of the user obtained during the play of a series of games.

According to a preferable twenty-second aspect, the game proceeding instructions include instructions for a game to proceed by determining whether the game has attained passing or not based on a passing condition corresponding to each phase, at a predetermined number of multiple phases. The display control instructions include instructions for displaying consecutively a plurality of image data obtained by the image pick-up device at each of multiple phases during game proceeding.

According to the twenty-second aspect, a plurality of image data corresponding to an appearance of the user obtained during the play of a series of games can be displayed in a manner like a motion picture. One can enjoy looking at an unexpected and/or amusing facial expression of the user.

A game device (100) according to a twenty-third aspect of the present invention includes an image pick-up unit (23) adapted to take a picture of a user, a display unit (12, 22), and a processor (31). The processor is operative to carry on a game based on a user's image included in image data obtained by the image pick-up unit, and display an image based on image data at the display unit. The image data is obtained by the image pick-up device when the user's image satisfies at least a predetermined condition.

According to the twenty-third aspect, image data of an appearance of a user taken at the timing of the user in the act of playing a game presented by the game device can be obtained. Namely, an image of the user in the act of playing a game can be picked up at the timing of a body recognition result satisfying a predetermined condition on the image data obtained by taking a picture of the user. By displaying these image data after the game is over, one can enjoy looking at an unexpected or amusing facial expression of the user in the act of playing the game.

Although reference characters for indicating the corresponding relationship with embodiments set forth hereinafter, as well as supplemental explanations and the like are provided in the description above for the better understanding of the present invention, they are not intended to limit the present invention in any manner.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7, 8 and 9 are first, second, and third diagrams, respectively, of an example of a scene in a first game according to the embodiment of the present invention.

FIG. 20 is a block diagram representing a control configuration of the game device according to the embodiment of the present invention.

DESCRIPTION OF THE PREFERRED EMBODIMENTS

Figure 1:
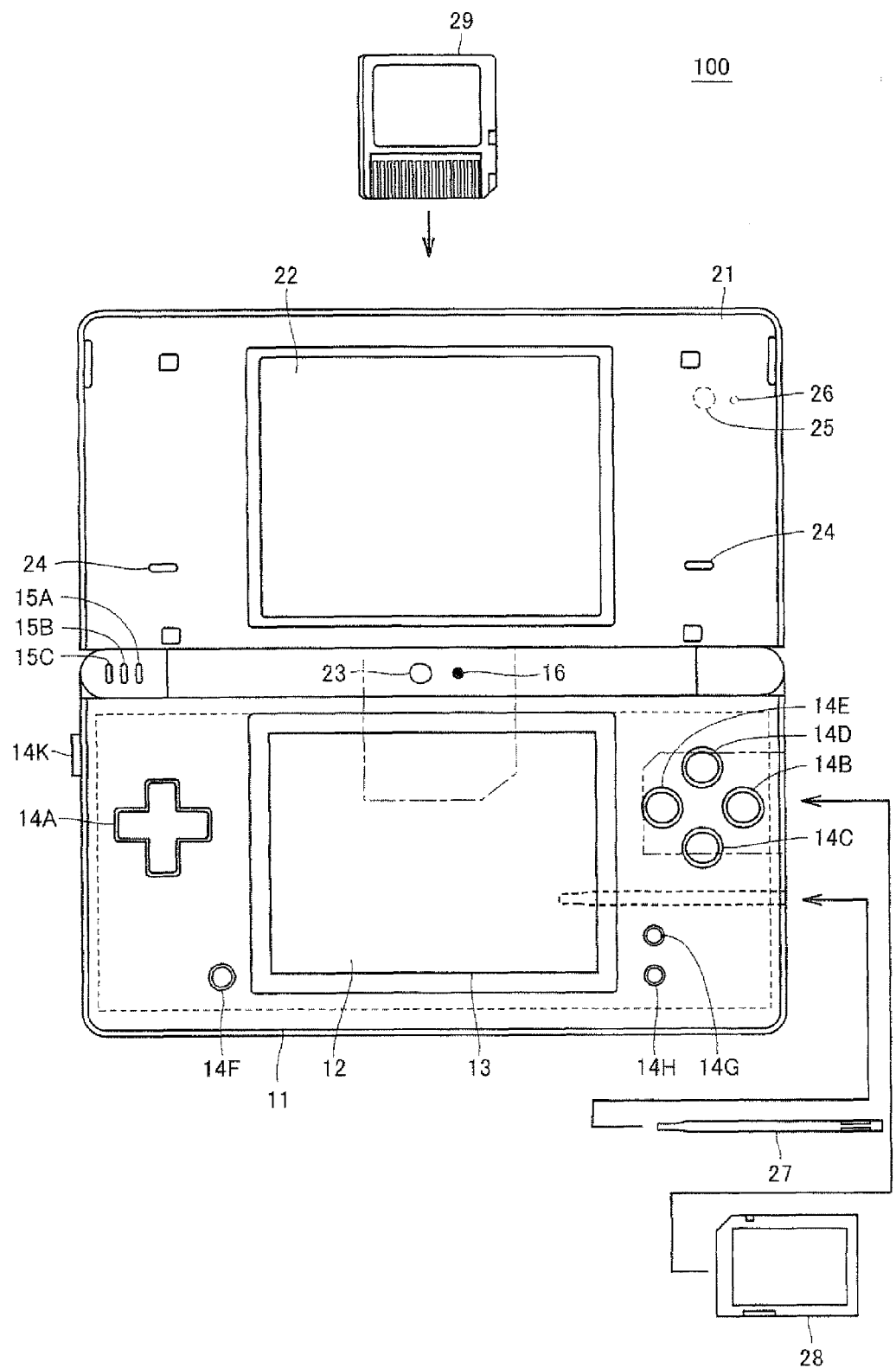
FIG. 1 represents an appearance (open state) of a game device according to an embodiment of the present invention.

Embodiments of the present invention will be described in detail hereinafter with reference to the drawings. The same or corresponding elements in the drawings have the same reference characters allotted, and detailed description thereof will not be repeated.

A portable game device 100 will be described hereinafter as a typical example of a game device (computer) of the present invention, Game device 100 interacts with an image pick-up device (or image pick-up unit), and a display device (or display unit). In addition, a game program executed by game device 100 that is a computer will be described as an example of a game program of the present invention. The computer according to the present invention is not limited to a game device, and may be implemented as a personal computer that can execute various applications. Further, the game program of the present invention may be incorporated as a partial function of various applications executed on a personal computer.

<Term>

As used herein, "interact with" means that devices such as an image pick-up device (or image pick-up unit) and a display device (or display unit) are connected through wired or wireless communication to a computer (typically, game device 100) to allow data communication. The devices such as an image pick-up device (or image pick-up unit) and display device (or display unit) may be configured integrally with or individually of game device 100.

<Appearance>

Figure 2:
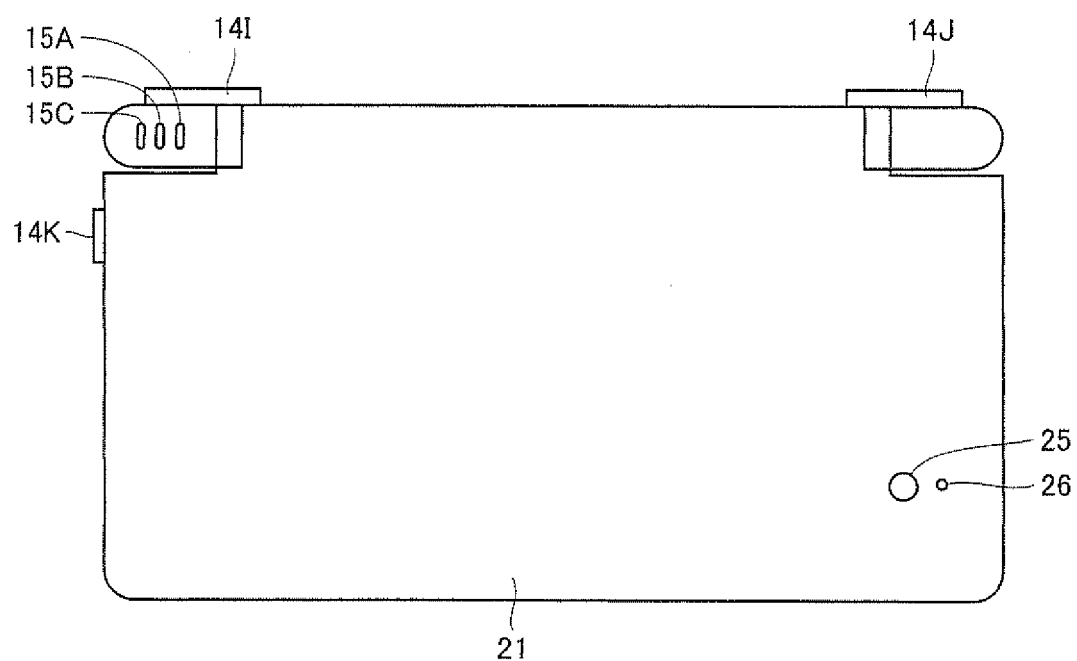
FIG. 2 represents an appearance (close state) of a game device according to the embodiment of the present invention.

FIGS. 1 and 2 represent the appearance of game device 100 according to an embodiment of the present invention.

Referring to FIGS. 1 and 2, game device 100 of the present embodiment is a foldable-type portable game device. FIG. 1 corresponds to an unfolded state (open state) whereas FIG. 2 corresponds to a folded state (closed state) of game device 100. Game device 100 is sized to allow the user to hold game device 100 with both hands or one hand even in the unfolded state.

Game device 100 includes a first housing 11 and a second housing 21. First housing 11 and second housing 21 are coupled to allow opening and closing (foldable). In the example of FIG. 1, first and second housings 11 and 21 each are formed in a rectangular plate-like form, coupled pivotable with respect to each other about the longer side thereof.

In a used mode, the user generally plays with game device 100 in the open state. In a non-used state, game device 100 is placed in a closed state. Game device 100 can be set such that the angle between first housing 11 and second housing 21 is maintained within the range of a close position (substantially 0°) and an open position (substantially 180°), as necessary. In other words, first housing 11 may be immobilized at an arbitrary angle with respect to second housing 21. This immobilization can be achieved by utilizing the friction force or the like occurring at the coupling between first housing 11 and second housing 21. In addition to or in lieu of the friction force, a latch mechanism may be employed for the coupling between first housing 11 and second housing 21.

A first LCD (Liquid Crystal Display) 12 is provided as a display unit (display device) in first housing 11. First LCD 12 takes a rectangular shape, arranged such that the direction of the longer side matches the direction of the longer side of first housing 11. Although the present embodiment is based on the case where an LCD is employed as the display unit (display device), any other appropriate display device such as a display device based on EL (Electro Luminescence), for example, may be employed. The resolution of the display unit (display device) can be designed as necessary, according to the application to be executed or the like.

In first housing 11, buttons 14A-14K to carry out various operations on game device 100 are provided as the input unit (input means). A direction input button 14A, an operation button 14B, an operation button 14C, an operation button 14D, an operation button 14E, a power button 14F, a start button 14G and a select button 14H among buttons 14A-14K are located on the inner main surface of first housing 11. This inner main surface implies the inner side when first and second housings 11 and 21 are folded.

In the arrangement shown in FIG. 1, direction input button 14A and power button 14F are located on the inner main surface of first housing 11 at one of the left and right sides (the left side in the drawing sheet of FIG. 1) with respect to first LCD 12 located substantially about the center of the inner side main surface of first housing 11. Buttons 14B-14E, start button 14G and select button 14H are located on the inner main surface of first housing 11 at the other of the left and right sides (the right side in the drawing sheet of FIG. 1) with respect to first LCD 12.

L button 14I is located at the left end of the upper side face, corresponding to the top side in the drawing sheet, of first housing 11. R button 14J is located at the right end of the upper side face of first housing 11. Volume button 14K is located at the left side face of first housing 11.

Direction input button 14A, L button 14I and R button 14J are used for a select operation, for example, or the like. Buttons 14B-14E are used for determination, cancel operations, for example, or the like. Power button 14F is used to turn ON/OFF the power of game device 100. Volume button 14K is used to adjust the volume of the speaker incorporated in game device 100.

Game device 100 further includes a touch panel 13 as another input unit (input means), in addition to buttons 14A-14K. Touch panel 13 is placed to cover the screen of first LCD 12 to detect the point of input contact by the user to output the coordinate thereof. In other words, touch panel 13 is arranged corresponding to the display screen of first LCD 12.

The type of touch panel 13 includes, but not limited to, the resistive touchscreen type. Various pressing-type touch panels may be employed, in lieu of the resistive touchscreen type. Further, the resolution (detection accuracy) of touch panel 13 is preferably at a level substantially equal to the resolution (display accuracy) of first LCD 12. However, the resolution of touch panel 13 does not necessarily have to match the resolution of first LCD 12.

At the right side face of first housing 11 in the drawing sheet, an insertion opening (represented by a broken line in FIG. 1) is provided. A touch pen 27 used to effect an input operation on touch panel 13 can be accommodated through the insertion opening. Although an input contact on touch panel 13 is generally carried out using touch pen 27, the input contact on touch panel 13 can be carried out with the user's finger or the like, instead of touch pen 27.

Further, an insertion opening for accommodating a memory card 28 (represented by a chain line with two dots in FIG. 1) is provided at the right side surface of first housing 1. At the inner side of this insertion opening, a connector (not shown) for electrically connecting game device 100 with memory card 28 is provided. Memory card 28 is attached to this connector in a detachable manner. Memory card 28 is used to read out a game program and/or image data obtained from another information processing device or game device, and to store (save) image data that is picked up and/or subjected to image processing by game device 100. Memory card 28 is formed of a non-volatile storage medium such as an SD (Secure Digital) card.

At the upper side face of first housing 11 corresponding to the top side in the drawing sheet, an insertion opening (indicated by a chain line with one dot in FIG. 1) is provided. At the inner side of this insertion opening, a connector (not shown) to electrically connect game device 100 with memory card 29 is provided. Memory card 29 is attached to this connector in a detachable manner. A game program or the like is stored in memory card 29.

At the left side in the drawing sheet of the coupling between first housing 11 and second housing 21, three LEDs 15A-15C are located. Game device 100 can establish wireless communication with another equipment, as will be described afterwards. First LED 15A is lit when the power of game device 100 is ON. Second LED 15B is lit according to the battery state (currently charging, low remaining battery level, or the like) of game device 100. Third LED 15C is lit according to a wireless communication state. The user can be notified of the ON/OFF state of the power, battery state, and wireless communication state of game device 100 by these three LEDs 15A-15C.

At second housing 21, a second LCD 22 is provided as another display unit (display device). Second LCD 22 takes a rectangular shape, arranged so that the direction of its longer side matches the direction of the longer side of second housing 21. Likewise with first LCD 12, another appropriate display device may be employed instead of an LCD. Although game device 100 is based on a configuration in which a touch panel serving as input means (input unit) is placed to cover the screen of first LCD 12, another touch panel may be additionally placed on the screen of second LCD 22.

Second housing 21 further includes two cameras (an inner camera 23 and an outer camera 25) as image pick-up devices (image sensors). As shown in FIG. 1, inner camera 23 is provided at the inner main surface in the vicinity of the coupling of second housing 21. As shown in FIG. 2, outer camera 25 is provided at the surface opposite to the inner main surface where inner camera 23 is provided, i.e. the outer main surface of second housing 21 (corresponding to the outer side surface when game device 100 takes a closed state). In FIG. 1, outer camera 25 is indicated by a broken line.

By the arrangement set forth above, inner camera 23 can pick up an image in a direction in which the inner main surface of second housing 21 faces. Namely, inner camera 23 is adapted to take a picture of the user player holding game device 100. Outer camera 25 can pick up an image in the direction opposite to the image pick-up direction of inner camera 23, i.e. the direction in which the outer main surface of second housing 21 faces.

A microphone (microphone 43 shown in FIG. 3) identified as a sound input device is accommodated inside the coupling of game device 100. A microphone hole 16 is provided at the inner main surface in the vicinity of the coupling of game device 100 for sensing the sound around game device 100. The location where microphone 43 is accommodated and where microphone hole 16 is formed does not necessarily have to be associated with the coupling. For example, microphone 43 may be accommodated in first housing 11, and microphone hole 16 may be formed on first housing 11 at a position corresponding to the location of microphone 43.

At the outer main surface of second housing 21, a fourth LED 26 (FIG. 2) is provided at a position in close proximity to outer camera 25. Fourth LED 26 is lit according to the image pick-up state by outer camera 25. Fourth LED 26 notifies any person present in the image pick-up field and any person nearby that an image is currently being picked up by game device 100. Specifically, fourth LED 26 is lit during the period over which an image is being picked up by outer camera 25. Moreover, fourth LED 26 may be lit in a blinking manner during the period over which a motion picture is being picked up by outer camera 25 (during the period over which picked-up image data is continuously obtained). In order to prevent the light beam emitted from fourth LED 26 from entering the image-taking screen, fourth LED 26 may be set to an OFF state in response to an instruction to pick up an image through camera until the image data obtained by the camera in response to the relevant instruction is completely stored into a memory or the like.

A sound emission hole 24 is provided in the inner main surface of second housing 21, on each of the left and right sides of second LCD 22 that is located around the central area of the inner main surface. A speaker (speaker 45 shown in FIG. 3) serving as a sound output device is accommodated in second housing 21 communicating with sound emission hole 24. In other words, sound emission hole 24 guides the sound emitted from speaker 45 outside of game device 100.

As described above, first housing 11 is provided with an input unit (touch panel 13 and buttons 14A-14K) to carry out entry towards game device 100, and a first LCD 12 that is a display device for displaying various images. Moreover, second housing 21 is provided with inner and outer cameras 23 and 25 to obtain image data, and a second LCD 22 that is a display device for displaying various images.

<Internal Configuration of Game Device>

Figure 3:
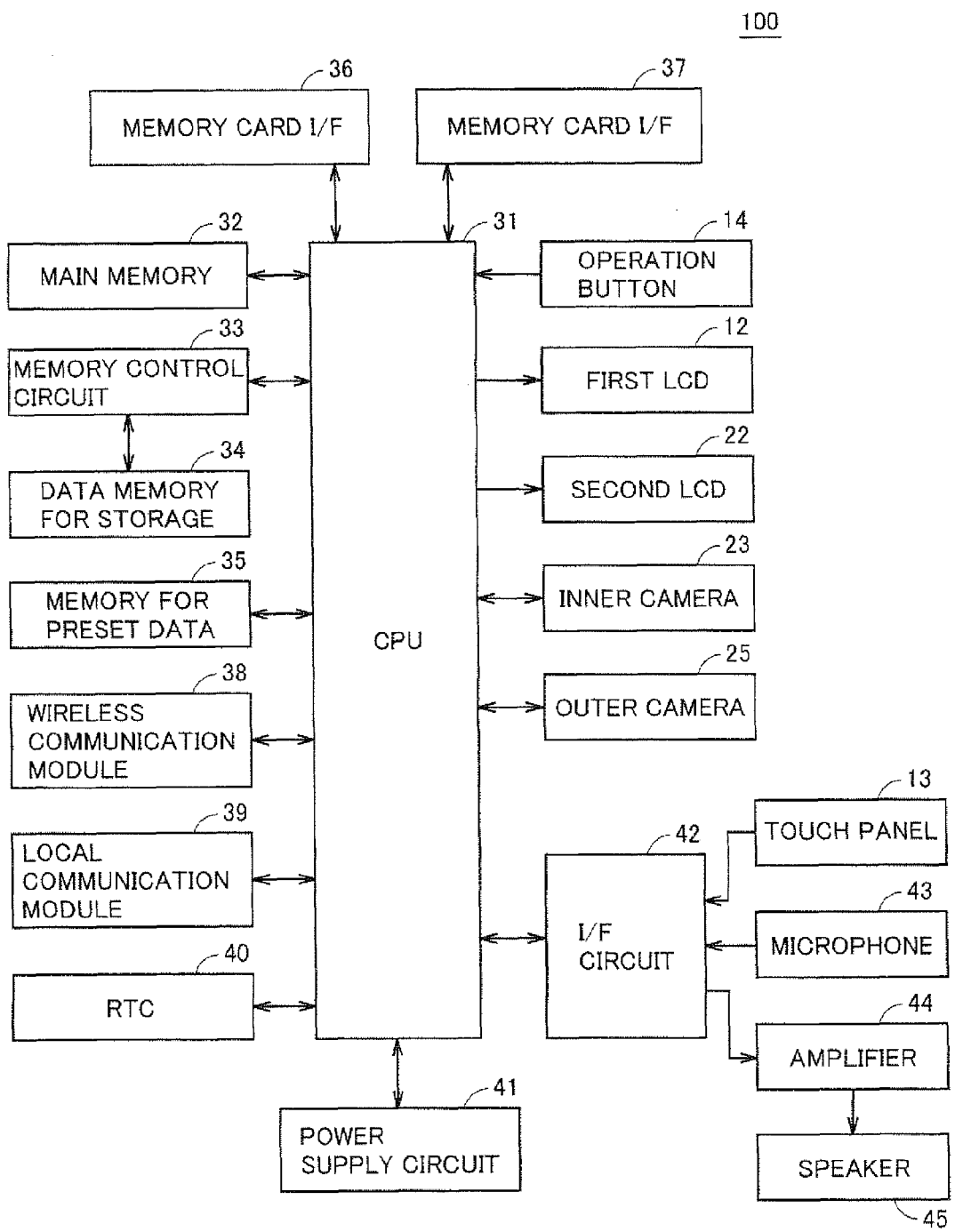
FIG. 3 is a block diagram representing an example of an internal configuration of a game device according to the embodiment of the present invention.

FIG. 3 is a block diagram representing an example of an internal configuration of game device 100 according to the embodiment of the present invention.

Referring to FIG. 3, game device 100 includes electronic components such as a CPU 31, a main memory 32, a memory control circuit 33, a data memory 34 for storage, a preset data memory 35, memory card interfaces (memory card I/Fs) 36 and 37, a wireless communication module 38, a local communication module 39, a real time clock (RTC) 40, a power supply circuit 41, and an interface circuit (I/F circuit) 42. These electronic components are mounted on an electronic circuit board, accommodated in first housing 11 (or second housing 21).

CPU 31 is a processor for executing various programs. CPU 31 transfers into main memory 32 for execution a game program stored in any of a memory in game device 100 (typically, data memory 34 for storage), memory card 28, and memory card 29. Through the execution of a game program by CPU 31, various processing according to the present embodiment that will be described afterwards are presented. As will be described afterwards, a game program according to the present embodiment is typically supplied to game device 100 from a distribution server device connected on the network through a wired or wireless communication line. The game program supplied to game device 100 is stored in data memory 34 for storage.

CPU 31 includes a VRAM (Video Random Access Memory) not shown to control display at first LCD 12 and second LCD 22. Image data and the like required for displaying various images, as will be described afterwards, are temporarily stored in this VRAM. The data stored in main memory 32 is transferred to the VRAM, or a file (data) and the like stored in data memory 34 are directly read out, and the contents are written into the VRAM.

Figure 4:
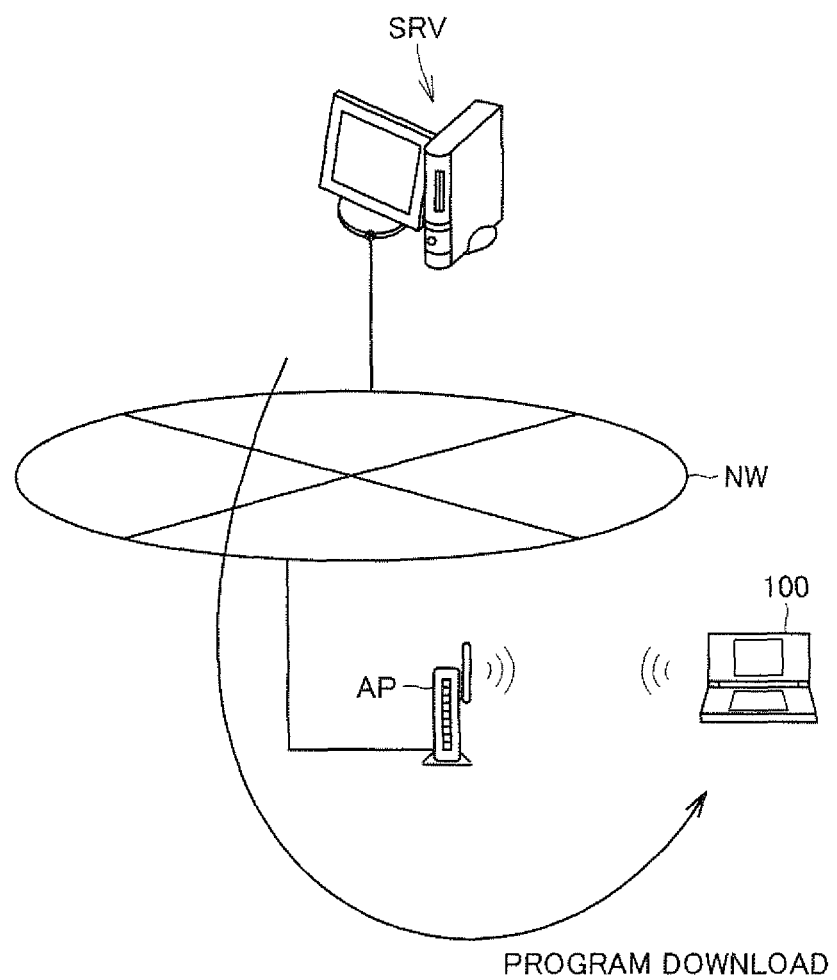
FIG. 4 represents a presented manner of a game program to the game device according to the embodiment of the present invention.

FIG. 4 represents a providing manner of a game program to game device 100 according to the embodiment of the present invention.

Referring to FIG. 4, a typical system distributing a game program according to the present embodiment includes a distribution server device SRV connected to a network NW such as the Internet, and an access point AP to establish wireless communication of game device 100 with network NW. Distribution server device SRV retains a plurality of game programs including the game program according to the present embodiment in a down-loadable manner, and initiates transmission of a requested game program (downloading) subsequent to carrying out a predetermined procedure in response to access from game device 100 or the like.

Access point AP establishes wireline connection with network NW, and wireless connection with wireless communication module 38 (FIG. 3). Game device 100 gains access to distribution server device SRV via access point AP. Upon receiving a game program distributed from distribution server device SRV as set forth above, CPU 31 of game device 100 stores the received game program in data memory 34 for storage or the like. The game program once stored in data memory 34 of game device 100 is basically not allowed to be transferred out from game device 100. Since the game program once introduced into game device 100 will be executed only at that game device 100, various settings, parameters and the like can be customized or arranged uniquely in that game device 100 according to the usage history and usage manner of the owner of that game device 100.

Alternative to the configuration of network distribution shown in FIG. 4, a memory card 28 or memory card 29 storing a game program may be offered to sale to provide the game program. In this case, the storage medium storing the game program according to the present invention is not limited to a semiconductor memory device such as memory card 28 or 29, and may be an optical storage medium such as a CD-ROM or DVD.

Referring to FIG. 3 again, main memory 32, memory control circuit 33, and preset data memory 35 are connected to CPU 31. Further, data memory 34 for storage is connected to memory control circuit 33.

Main memory 32 is the storage means used as a work area or buffer area for CPU 31. In other words, main memory 32 temporarily stores data used in various processing, and/or transfers a game program read out from data memory 34, memory card 38, memory card 29 or the like for temporary storage. In the present embodiment, a PSRAM (Pseudo-SRAM), for example, is used as main memory 32.

Data memory 34 is the storage means for storing a game program executed by CPU 31, and/or image data picked up by inner camera 23 and outer camera 25, or the like. Data memory 34 is formed of a non-volatile storage medium such as a NAND type flash memory. Memory control circuit 33 serves to control the reading of data from data memory 34 and writing of data to data memory 34 according to an instruction from CPU 31.

Preset data memory 35 is the storage means for storing data of various parameters and the like set in advance (preset data) in game device 100. For preset data memory 35, a flash memory connected to CPU 31 through an SPI (Serial Peripheral Interface) bus can be employed.

Memory card I/Fs 36 and 37 each are connected to CPU 31. Memory card I/F 36 carries out data reading and writing with respect to memory card 38 attached to the connector according to an instruction from CPU 31. Memory card I/F 37 carries out data reading and writing with respect to memory card 29 attached to the connector according to an instruction from CPU 31.

In the present embodiment, image data obtained by inner camera 23 and outer camera 25 and/or image data obtained from another device is written into memory card 28 via memory card I/F 36. The image data stored in memory card 28 is read out via memory card I/F 36 to be written as a file into data memory 34 for storage. Each program stored in memory card 29 is read out via memory card I/F 37 to be written into main memory 32.

Wireless communication module 38 is capable of connection with a wireless LAN by a scheme in compliance with, for example, the IEEE802.11.b/g specifications. Local communication module 39 is capable of establishing wireless communication with the same type of game device by a predetermined communication scheme. Wireless communication module 38 and local communication module 39 are connected to CPU 31. CPU 31 can transmit and receive data with respect to another apparatus via a network line such as the Internet using wireless communication module 38, and/or transmit and receive data with respect to another game device of the same type using local communication module 39.

RTC 40 and power supply circuit 41 are connected to CPU 31. RTC 40 counts the time, which is provided to CPU 31. For example, CPU 31 can calculate the current time (date) and the like based on the time counted by RTC 40. Power supply circuit 41 controls the power supplied from a power supply of game device 100 (typically, a battery, stored in first housing 11) to supply power to various components in game device 100.

Game device 100 further includes an L/F circuit 42 connected to CPU 31. Microphone 43, amplifier 44 and touch panel 13 are connected to I/F circuit 42. I/F circuit 42 includes a sound control circuit carrying out the control of microphone 43 and amplifier 44 (as well as speaker 45), and a touch panel control circuit controlling touch panel 13.

Microphone 43 senses the user's voice or the like uttered towards game device 100. A sound signal representing the sensed voice is provided to I/F circuit 42. Amplifier 44 amplifies the sound signal from I/F circuit 42 for output from speaker 45. Namely, the sound control circuit in I/F circuit 42 carries out A/D conversion on the sound signal sensed through microphone 43 to provide the result to CPU 31. This sound control circuit also carries out D/A conversion on a signal generated at CPU 31 and the like to provide the result to amplifier 44. Moreover, the sound control circuit converts the sound signal into sound data of a predetermined form suitable for storage.

The touch panel control circuit in I/F circuit 42 generates touch position data for output to CPU 31 according to a detection signal from touch panel 13. For example, the touch position data includes coordinates representing the position of the input point carried out on the input screen of touch panel 13 (hereinafter, also referred to as "input coordinate"). The touch panel control circuit executes the reading of a signal from touch panel 13 and generation of the touch position data in a predetermined cycle period. CPU 31 can detect the input coordinate corresponding to the input operation made by the user on touch panel 13 by obtaining touch position data via I/F circuit 42 (touch panel control circuit).

Button 14 generically designates buttons 14A-14K set forth above, and is connected to CPU 31. Operation data indicating respective input states (whether depressed or not) of buttons 14A-14K is output from button 14 to CPU 31. CPU 31 executes processing corresponding to a user's operation on button 14 by obtaining operation data from button 14.

Each of inner and outer cameras 23 and 25 is connected to CPU 31. Inner and outer cameras 23 and 25 pick up an image according to an instruction from CPU 31, and provides the obtained image data to CPU 31. Each of inner and outer cameras 23 and 25 includes an image sensing element such as a CCD (Charge Coupled Device) or CIS (CMOS Image Sensor), and a peripheral circuit to read out the image data obtained at the image-sensing element. For example, CPU 31 designates one of inner camera 23 and outer camera 25 to pick up an image, and the image data obtained by the camera corresponding to the image pick-up instruction is provided to CPU 31.

First LCD 12 and second LCD 22 are both connected to CPU 31. Each of first and second LCDs 12 and 22 displays an image according to an instruction from CPU 31. In one event, CPU 31 causes one of first and second LCDs 12 and 22 to display an image obtained by inner camera 23 or outer camera 25, and causes the other of first and second LCDs 12 and 22 to display a screen (image) directed to accepting an operation from the user and/or to providing an operation explanation for the user.

<Summary of Application>

A general outline of the application presented by executing a game program according to the present embodiment will be described hereinafter. An application including the game processing and the display processing after the game is over is presented at game device 100 according to the present embodiment. As the game processing, an image of mainly the user's face and hands is picked up by means of an image pick-up device (typically, inner camera 23), and a game proceeds based on the user's image included in the image data obtained by the pick-up. As used herein, a "user's image" implies an image including an area in which at least the user appears as the subject among the image data obtained by the image pick-up unit. Specifically, body recognition processing is executed on the obtained pick-up data (typically, the skin tone area detection processing and/or face recognition processing) in order to identify a user's image. Based on the recognition result (user's image), determination is sequentially made as to whether a predetermined condition corresponding to the game proceeding is satisfied or not. Then, how the game proceeds is decided based on the determination result. As will be described afterwards, a game may proceed based on user's sound data gathered by microphone 43, in addition to the user's image included in the image data obtained by the image pick-up unit. In the present specification, a "game" includes a series of games corresponding to a predetermined scenario, and also an aggregation of a plurality of sub-games.

According to game device 100 of the present embodiment, a picture of the user in the act of playing a game is picked up appropriately by the image pick-up unit during the proceeding of such series of games in relation to or independent of the condition determination result to proceed with the game. An image based on image data obtained by such pictures is displayed on the display unit (typically, second LCD 22) when the game is not played (typically, after the series of games is over). The user and any person nearby can enjoy looking at the displayed facial expression and the like of the user in the act of playing a game.

Figure 5:
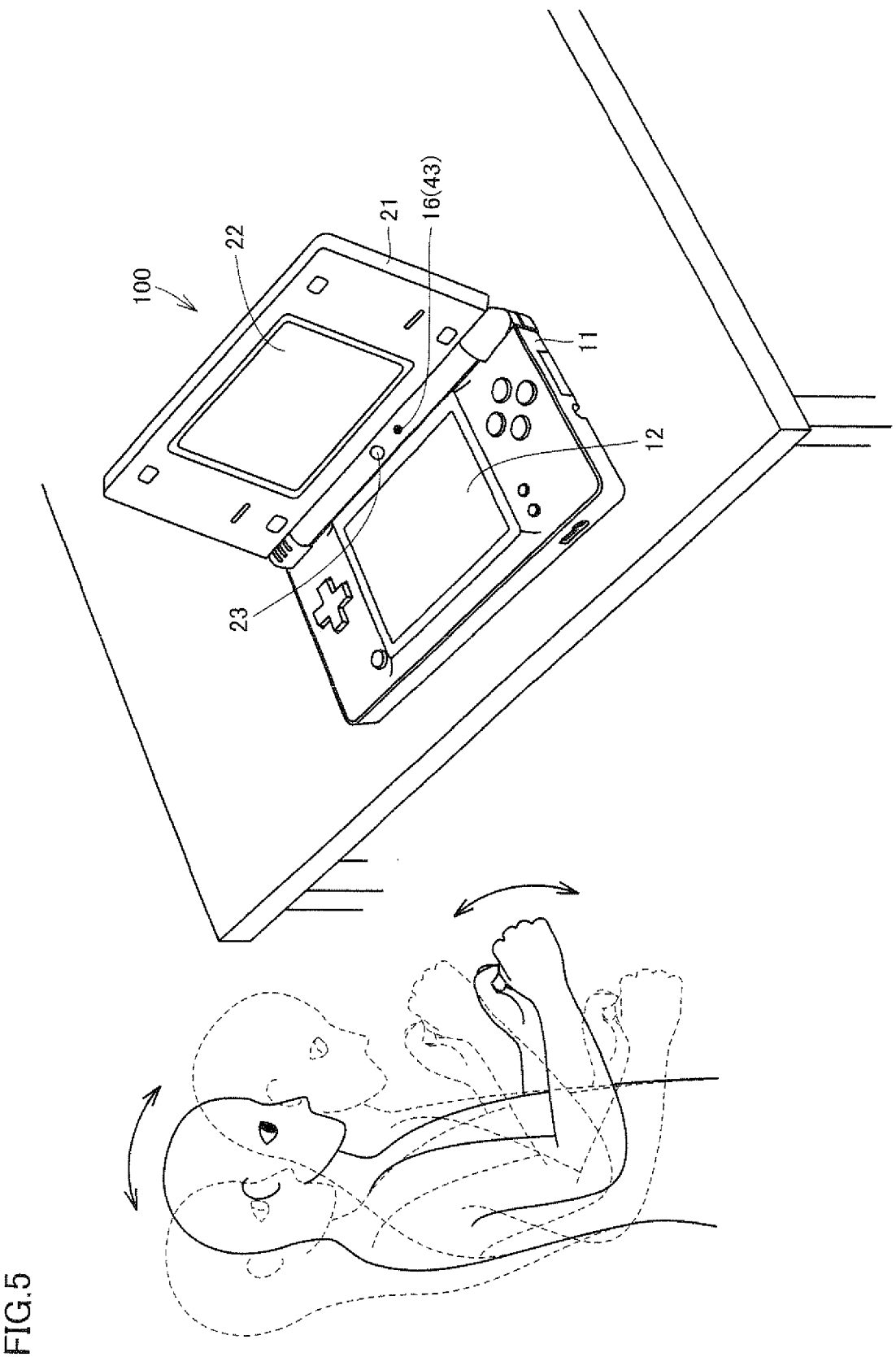
FIG. 5 schematically represents a manner of a user playing the game device according to the embodiment of the present invention.

FIG. 5 is a schematic diagram representing a manner of the user playing game device 100 according to the embodiment of the present invention. As shown in FIG. 5, game device 100 is typically placed on a desk or the like, i.e. the range of pick-up by inner camera 23 is fixed, and the user moves his/her head, body, hands or the like according to the game effect. In response, the recognition result by game device 100 (that is, the user's image included in the obtained image data) changes, and determination is sequentially made as to whether the game proceeding condition is satisfied or not based on the changing recognition result.

Figure 6:
FIG. 6 is a diagram to describe an example of processing over time, executed by the game device according to the embodiment of the present invention.

FIG. 6 is a diagram to describe an example of the processing over time executed by game device 100 according to the present invention. When the game proceeding is started at game device 100 according to the present embodiment, the acquirement of image data by the image pick-up unit (inner camera 23) and execution of body recognition processing based on the obtained image data are carried out repeatedly at a predetermined cycle. Based on the recognition result obtained (updated) periodically, the game proceeds. In other words, the game sequentially proceeds according to the sequential meeting of condition 1, 2, . . . with respect to the recognition result. In the case where all the conditions (or, a game passing condition) is not satisfied within a predetermined time, determination of "fail" in the relevant game may be made. In the present specification, a state where all the conditions prepared in view of the game proceeding being satisfied may be referred to as "passing".

Concurrently with the game proceeding, an appearance of the user in the act of playing a game is picked up by the image pick-up unit. The image data obtained for body recognition processing is basically discarded without being saved. In contrast, the image data representing the appearance of the user in the act of playing a game is stored in main memory 32 or the like. For the sake of clearly identifying the difference therebetween, the process of storing (saving) image data representing an appearance of the user in the act of playing a game is also referred to as "capture".

Although the body recognition processing and capture mutually employ image data obtained by the image pick-up unit, the timing of using image data may differ in each processing. In the body recognition processing, the image data is processed at a predetermined cycle. In the capture processing, image data is stored at a timing corresponding to an event such as when a predetermined condition is satisfied.

As shown in FIG. 6, image data is captured at each timing of the recognition result satisfying condition 1, 2, . . . during the game proceeding. Specifically, determination is made as to whether the game attains passing or not based on the user's image included in the image data obtained by the image pick-up unit (inner camera 23), and image data obtained by the image pick-up unit corresponding to the time when determination is made that the game has attained passing is saved. FIG. 6 corresponds to the case where both the condition employed for game proceeding and the condition for determining the timing of capture execution are the same. However, the conditions therebetween do not have to be necessarily the same, and conditions independent of each other may be set according to the game scenario.

When the series of game is over, image data 1, 2, . . . captured during the game play is displayed (replayed). After the game is over, image data is displayed in various manner corresponding to the game content.

Game device 100 of the present embodiment typically presents the three types of games set forth below. Examples of the game content and the display form of images displayed when the game is over will be described hereinafter. These games are selectively executed partially or entirely according to the user's instruction. Further, the timing of display is not limited to the timing when the game is over, and the image data may be replayed at an arbitrary timing specified by the user.

<First Game>

The first game presented by game device 100 of the present embodiment and the display form of an image after the first game is over will be described with reference to FIGS. 7-9 and FIGS. 10A and 10B. During the play of the first game, the appearance of the user in the act of playing a game is captured from the start to the end of the game every time a plurality of different conditions including the condition to determine that the game has attained "passing" are satisfied. When the first game is over, the image data of a plurality of captured images are displayed along the captured time sequence or in a manner switched according to a random order (consecutively). Thus, after the first game is over, the appearance of the user in the act of playing the first game is displayed in a motion-picture-like manner. Namely, a motion-picture-like image having a plurality of image data switched in a predetermined time is displayed in the first game as the image display based on the stored image data. Further, the displaying order of the image data can be changed, differing from the original picked-up order to present a more enjoyable image display. Further, by setting the display speed (the switching rate of image data) shorter than the actual image pick-up interval, an image with more motion can be displayed.

Figure 7:
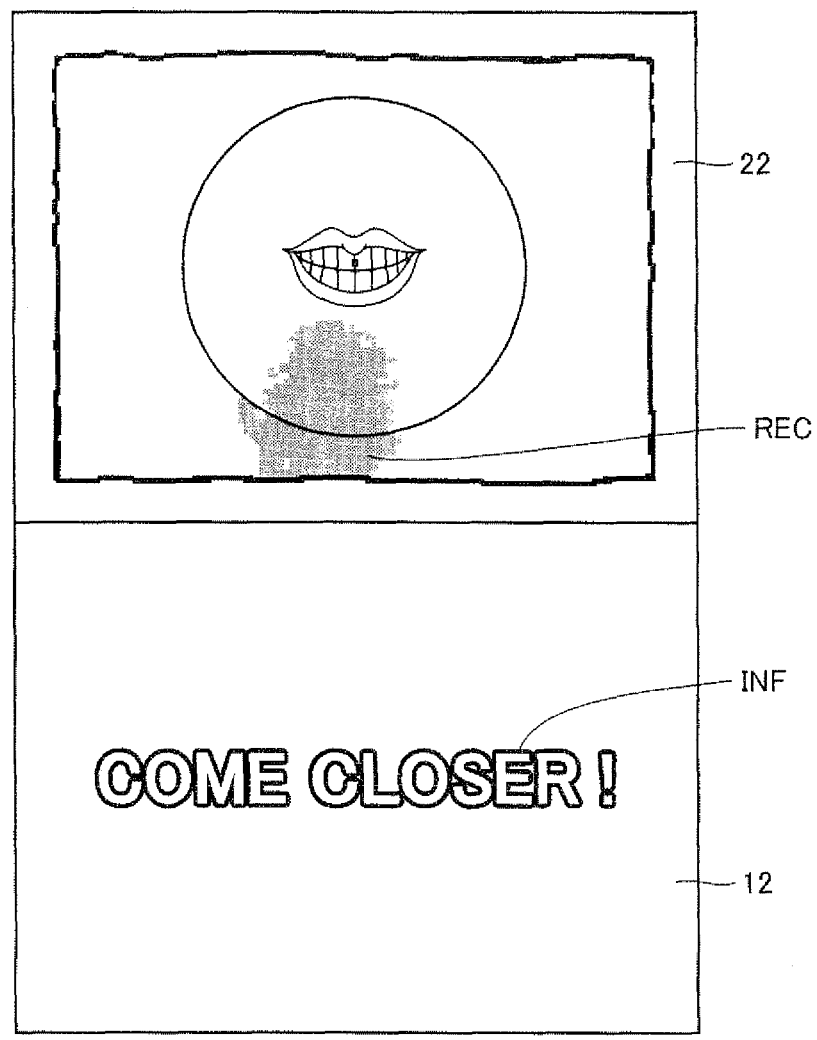
Figure 10A:
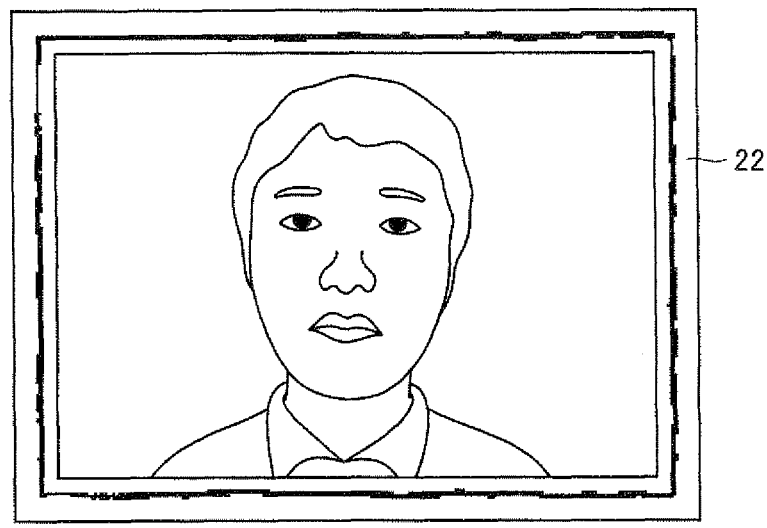
FIGS. 10A and 10B represent an exemplified display of an image after the first game is over according to the embodiment of the present invention.
Figure 10B:
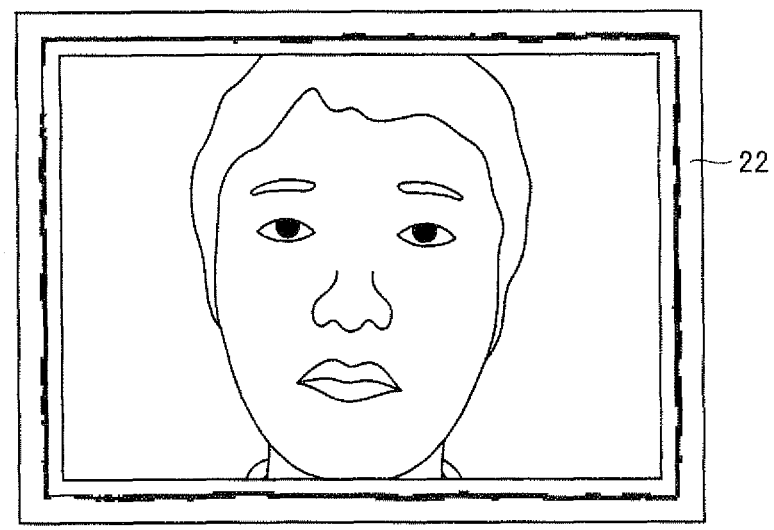

FIGS. 7-9 represent exemplified scenes of the first game according to the embodiment of the present invention. FIGS. 10A and 10B represent exemplified displays of an image after the first game is over.

The first game according to the present embodiment directs the user to move his/her face closer to game device 100 (inner camera 23) such that the recognition result with respect to image data obtained by inner camera 23 exceeds the size of a predetermined determination area.

When the start of the first game is designated by the user, an image as shown in FIG. 7 is displayed at first LCD 12 and second LCD 22. For the sake of simplification, the entire image (screen shot) displayed at each of first and second LCDs 12 and 22 is depicted aligned together in FIGS. 7 to 9. The same applies to other drawings.

Specifically, in the scene of FIG. 7, an information image INF informing the user what kind of motion is to be done is displayed at first LCD 12. In the example of FIG. 7, an image indicating the message of "Come Closer!" informing the user to move his/her face closer is displayed at first LCD 12. At second LCD 22, an image object in accordance with the game effect (in the example of FIG. 7, an image of the mouth of a person) is displayed, bringing about together a recognition display REC representing the range of the user's face detected by the body recognition processing on the image data obtained by inner camera 23. Basically, this recognition display REC is sequentially updated at every execution cycle of skin tone area detection processing that will be described afterwards.

FIG. 7 represents the state in which the user appears only at the relatively lower side position in the image data obtained by inner camera 23. Therefore, recognition display REC corresponding to the position of the user's face that is picked up is brought up only at the lower side in second LCD 22.

As the user moves his/her face closer to game device 100 such that the range of the user appearing in the image data obtained by inner camera 23 increases, the screen as shown in FIG. 8 appears. In the state of FIG. 8, the image object of the mouth of a person more magnified as compared to FIG. 7 is displayed, together with a recognition display REC of a larger range.

Further, as the user moves his/her face closer to game device 100 such that the range of the user appearing in the image data obtained by inner camera 23 further increases, the screen as shown in FIG. 9 appears. FIG. 9 represents that the first game has attained "passing". When the first game attains "passing", an image object of the mouth of a person more magnified as compared to FIG. 8 is displayed, together with a decorative object of a bird looking out from between the teeth.

In the series of games shown in FIGS. 7-9, the user changes his/her relative position with respect to game device 100 according to the game proceeding while looking at the game effect and recognition display REC displayed at second LCD 22. During the play of the first game, such an appearance of the user in the act of playing the game is captured several times. When the first game is over, the plurality of image data captured are sequentially displayed. Examples of such displayed image data are shown in FIGS. 10A and 10B.

The face of the user playing the first game appears smaller in FIG. 10A as compared to the user's face in FIG. 10B. This corresponds to the state shown in FIG. 8 set forth above, representing the case where the user's face is relatively far away from game device 100. The user's face appears over a larger range in FIG. 10B, as compared to FIG. 10A. This corresponds to the state shown in FIG. 9 set forth above, representing the case where the user's face is relatively close to game device 100.

By consecutively switching and displaying such images, the portrait of the user playing the first game can be displayed in a motion-picture-like manner. In other words, the state of the user playing the first game can be presented in a replayed manner.

Although FIGS. 10A and 10B correspond to the case where typically two image data are sequentially switched, more image data can be obtained during the first game to sequentially switch and display multiple image data.

<Second Game>

A second game presented by game device 100 of the present embodiment and a display form of the image after the second game is over will be described hereinafter with reference to FIGS. 11A, 11B, 12A, 12B, 13A and 13B. Typically, a plurality of sub-games constitute the second game. During the play of each sub-game, at least one picture of the user in the act of playing the sub-games is captured at the timing of satisfying a predetermined condition. When the series of sub-games is over, i.e. after the second game is over, an object related to a corresponding sub-game or an object having a meaning different from that of the corresponding sub-game is overlaid on each captured image data for display. Therefore, when the second game is over, the appearance of a user at a certain timing during the play of the second game (typically, the timing around the relevant sub-game attaining "passing") is displayed together with an object corresponding to the relevant game effect, or an object independent of (not related to) the relevant game effect. Each captured image data in each of the plurality of sub-games is preferably switched and displayed at every predetermined time, i.e. displayed in the so-called slideshow manner.

The game may be configured to allow which of the sub-games is to be executed randomly among a plurality of sub-games prepared in advance when the user designates the start of the second game.

FIGS. 11A, 11B, 12A, 12B, 13A and 13B represent exemplified scenes during the play or after the second game is over according to the embodiment of the present invention.

(1) First Sub-Game

Figure 11B:
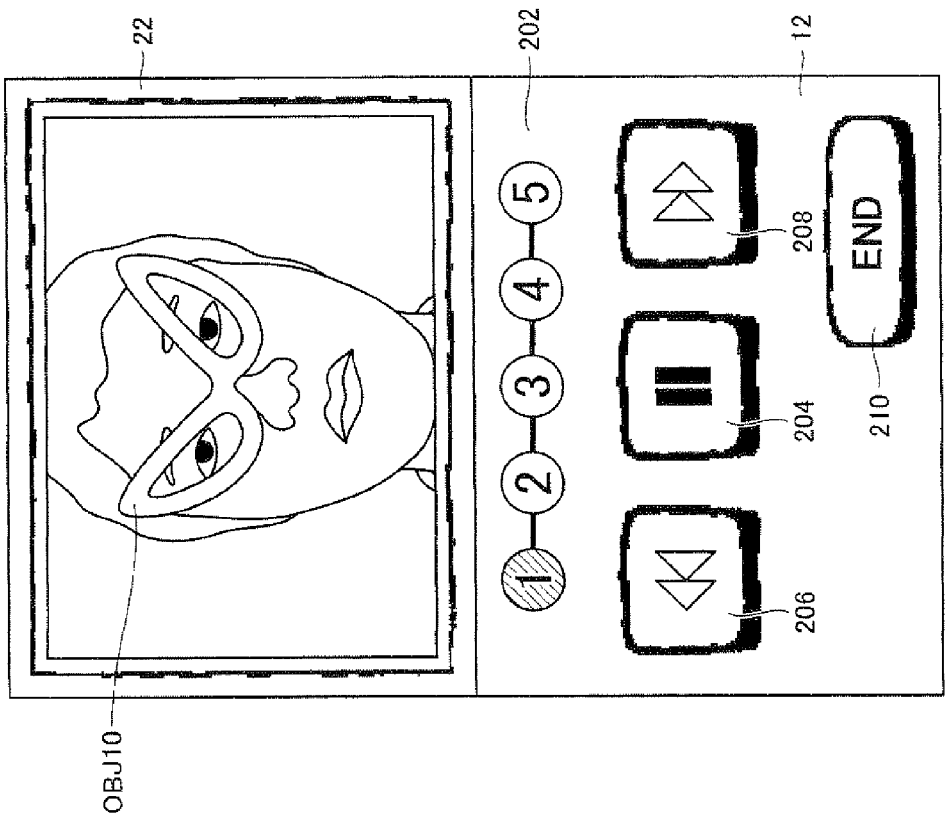
FIGS. 11A and 11B represent an example (No. 1) of a scene during a second game and after the second game is over, respectively, according to the embodiment of the present invention.
Figure 11A:
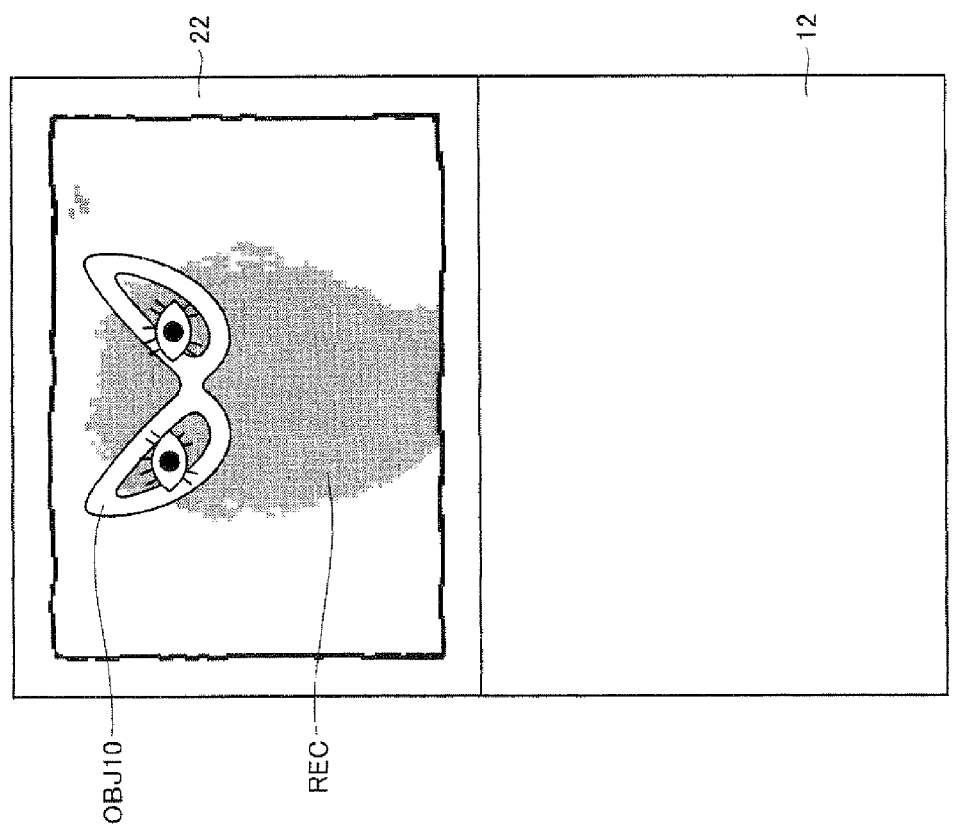

At the first sub-game in the second game shown in FIG. 11A, a "glasses" object OBJ10 is displayed at a predetermined position on second LCD 22. The user adjusts his/her relative position to game device 100 (inner camera 23) such that the recognized position of player's eyes matches object OBJ10.

In the scene of FIG. 11A, an image object of the game effect (object OBJ10) is displayed at second LCD 22, bringing about together a recognition display REC representing the range of the user's face detected by the body recognition processing on the image data obtained by inner camera 23. This recognition display REC is sequentially updated at every processing cycle of the skin tone area detection that will be described afterwards. Moreover, an image object representing "eyes" is displayed at the position of the pupil of the user detected by the body recognition.

When the user adjusts his/her relative position with respect to game device 100, and determination is made that the position of the user's pupil detected by the body recognition in the image data obtained by inner camera 23 matches the arranged position of object OBJ10, the first sub-game attains "passing". Thus, determination is made as to whether a passing condition associated with the position of an object displayed in line with the game effect is satisfied or not based on the body recognition result.

Referring to FIG. 11B, image data captured during playing the first sub-game shown in FIG. 11A is displayed at second LCD 22 when the second game is over. This displayed image typically has "glasses" object OBJ10 that was displayed during the play of the first sub-game overlaid thereon. Although a "glasses" object identical to the "glasses" displayed in the corresponding first sub-game is displayed in the example of FIG. 11B, "glasses" of another type may be overlaid for display. Alternatively, an image object completely different from "glasses" may be overlaid for display.

At first LCD 12, a button image to control the display (slideshow) of image data captured at each of the plurality of sub-games is presented. Specifically, at first LCD 12 are displayed an order notification image 202, a stop button image 204, a return button image 206, a forward button image 208, and an end button image 210. A touch panel 13 is provided on first LCD 12. The coordinate of the touched contact on touch panel 13 is detected when the user touches any area on first LCD 12. When any of the button images set forth above is displayed at the detected coordinate, the processing assigned to the corresponding button image is executed, as will be described hereinafter.

Order notification image 202 notifies in which sub-game the currently-displayed image data has been captured. The example of FIG. 11B corresponds to the case where five sub-games have already been played, and the currently-displayed image data has been captured in the first sub-game. Stop button image 204 accepts designation of stopping the switching display (slideshow) of image data. When in the state of the slideshow being stopped, a play button image to accept designation of recommencing the slideshow is displayed instead of stop button image 204. Return button image 206 accepts designation to return to one previous displayed image data with respect to the currently-displayed image data, among the series of image data. Forward button image 208 accepts designation to advance the displayed image data to one ahead of the currently-displayed image data, among the series of image data. End button image 210 accepts designation of ending display of image data.

(2) Second Sub-Game

Figure 12B:
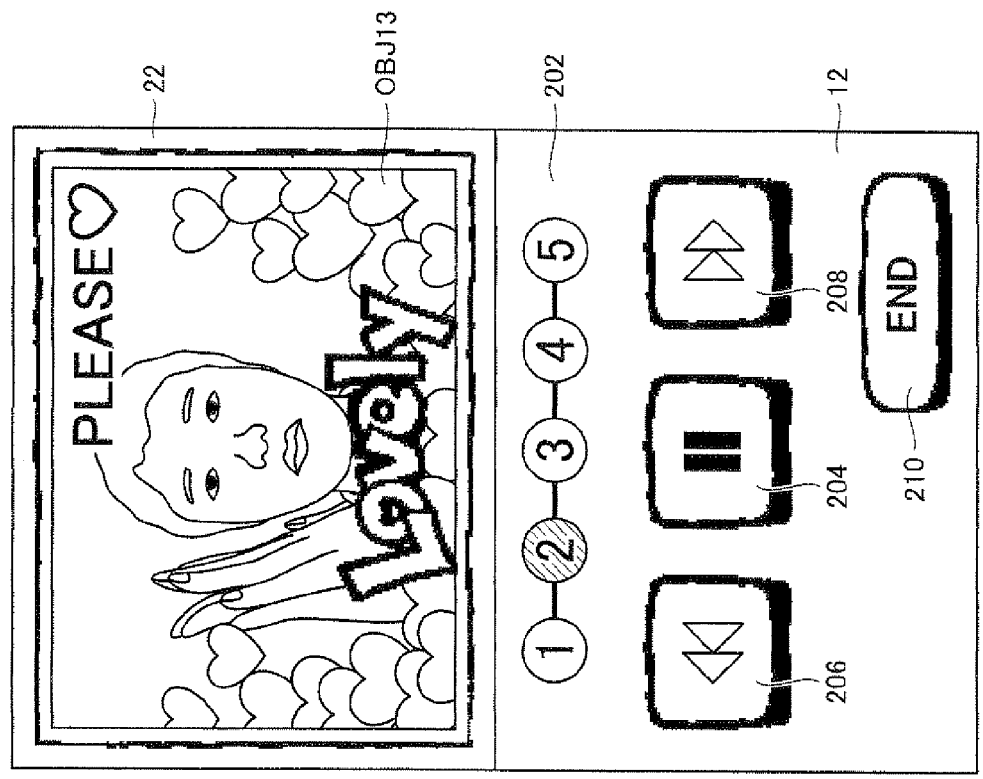
FIGS. 12A and 12B represent an example (No. 2) of a scene during the second game and after the second game is over, respectively, according to the embodiment of the present invention.
Figure 12A:
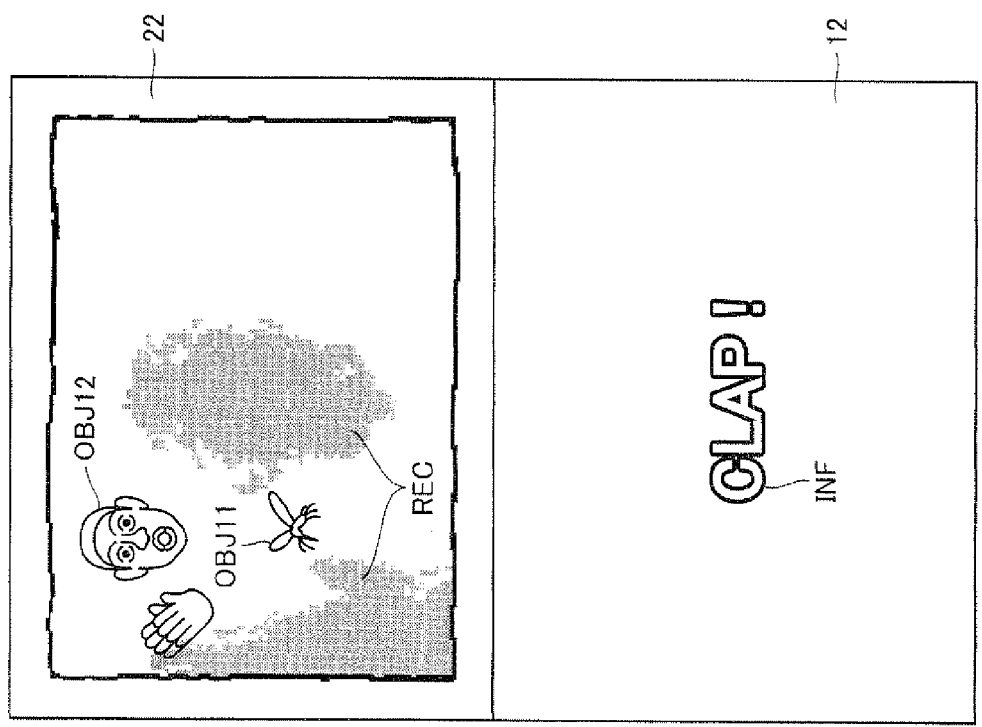

At the second sub-game included in the second game shown in FIG. 12A, an object OBJ11 representing a "mosquito" is displayed in a moving manner at second LCD 22. The user claps his/her hands such that object OBJ11 is "squashed" in response to the recognized motion of the user's hands.

In the scene of FIG. 12A, the image of the game effect (object OBJ11) is displayed changing its position over time, and an object OBJ12 prompting the user to clap one's hands, is displayed. In addition, at second LCD 22, a recognition display REC representing the range of the user's hands and face detected by the body recognition processing on the image data obtained by inner camera 23 is brought about. This recognition display REC is sequentially updated at every processing cycle of the skin tone area detection that will be described afterwards. At first LCD 12, an information image INF indicating a message of "Clap!" informing the user to clap his/her hands is displayed.

When the user claps his/her hands upon adjusting his/her relative position with respect to game device 100, the body recognition processing is carried out on the image data obtained by inner camera 23. When recognition is made that the user has clapped his/her hands corresponding to the position of object OBJ11, the second sub-game attains "passing", and a scene of the "mosquito" falling downwards in the screen is produced.

Referring to FIG. 12B, the image data captured during the play of the second sub-game shown in FIG. 12B is displayed at second LCD 22 when the second game is over. In this displayed image, an object OBJ13 having a different meaning, independent of "mosquito" object OBJ11 that was displayed during the play of the second sub-game, is overlaid on the displayed image. In other words, the movement of the user squashing the "mosquito" is replaced with an enjoyable (lovely) expression of the user for display.

Likewise with FIG. 11B set forth above, a button image to control the display (slideshow) of image data captured at each of the plurality of sub-games and the like is displayed on first LCD 12.

As shown in FIGS. 12A and 12B, after the second sub-game is over, an object that was displayed during playing the second sub-game is replaced with another object for image display during the display of an image based on the image data captured during playing the second sub-game, and this another object is located at the position where the former object was located. Particularly in the examples of FIGS. 12A and 12B, an object ("heart mark" or the like in the example of FIG. 12B) not related to the object ("mosquito" in the example of FIG. 12A) that was displayed during the progress of the second sub-game is displayed together with the image data captured during playing the second sub-game.

(3) Third Sub-Game

Figure 13A:
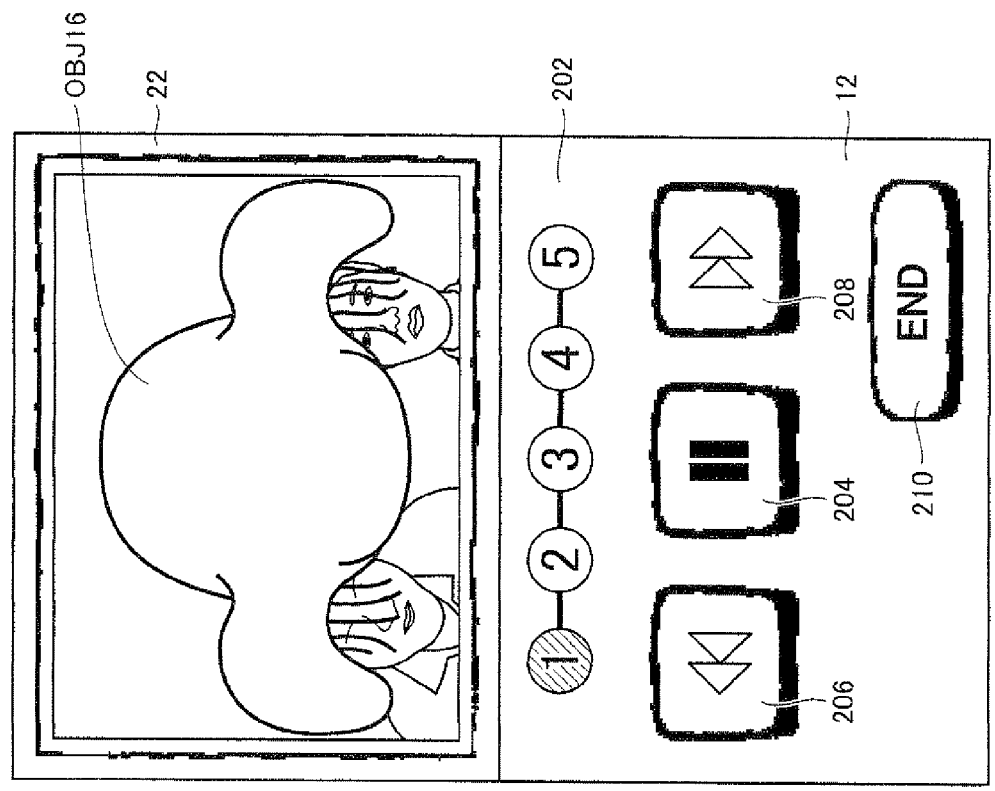
FIGS. 13A and 13B represent an example (No. 3) of a scene during the second game and after the second game is over, respectively, according to the embodiment of the present invention.

In the third sub-game included in the second game shown in FIG. 13A, two users can play the game. Specifically, in the third sub-game of FIG. 13A, an object OBJ14 and an object OBJ15 of two "totem poles" are displayed at second LCD 22, bringing about together a recognition display REC representing the range of each user detected by the body recognition processing on the image data obtained by inner camera 23. This recognized display REC is sequentially updated at every processing cycle of the skin tone area detection that will be described afterwards. A circular cutout area is provided in each of "totem pole" objects OBJ14 and OBJ15. Each player adjusts his/her relative position with respect to game device 100 (inner camera 23) such that the recognized position of each player's face matches a corresponding cutout area.

Further, an information image INF representing a message of "Fit In!" informing the player to fit his/her face to match a predetermined position is displayed.

When both players adjust their relative position with respect to game device 100, and determination is made that the position of the face subjected to body recognition in the image data obtained by inner camera 23 matches the cutout area of corresponding objects OBJ14 and OBJ15, the third sub-game attains "passing".

Figure 13B:
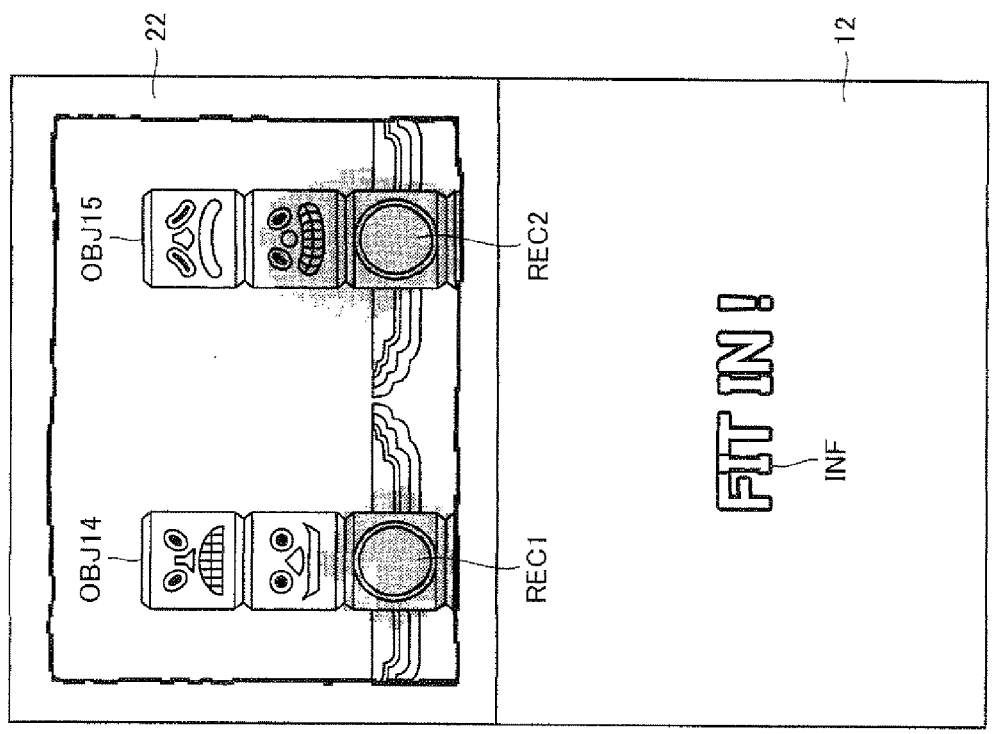

Referring to FIG. 13B, the image data captured during the play of the third sub-game shown in FIG. 13A is displayed at second LCD 22 after the second game is over. An object OBJ16 having a different meaning, independent of "totem pole" objects OBJ14 and OBJ15 displayed during playing the third sub-game, is overlaid on the displayed image. Namely, the portrait of the players located at each cutout area provided at the totem pole is displayed in a replaced manner with both players popping out from a large "nose".

Likewise with FIG. 11B set forth above, a button image or the like to control the display (slideshow) of image data captured during each of the plurality of sub-games is displayed on first LCD 12.

Thus, an object corresponding to the game effect of a corresponding sub-game, or an object independent of (i.e. having a different meaning) the game effect in the corresponding sub-game is overlaid on the appearance of the user captured in the act of playing (the sub-game in) the second game for display. Thus, the user can enjoy a more amusing image utilizing the appearance of the user playing the sub-game.

As shown in FIGS. 13A and 13B, after the third sub-game is over, an object that was displayed during playing the third sub-game is replaced with another object for image display during the display of an image based on the image data captured during playing the third sub-game. Particularly, in the examples of FIGS. 13A and 13B, an object ("nose" or the like in the example of FIG. 13B) not related to the object ("totem pole" in the example of FIG. 13A) that was displayed during the proceeding of the third sub-game is displayed together with the image data captured during playing the third sub-game.

<Third Game>

A third game presented by game device 100 of the present embodiment and a display form of an image after the third game is over will be described hereinafter with reference to FIGS. 14-18 and FIGS. 19A-19F. A series of a plurality of sub-games constitute the third game. During playing each sub-game, at least one picture of the user in the act of playing a game is captured at the timing of satisfying a predetermined condition. When the series of sub-games is over, i.e. when the third game is over, a cartoon-like representation along a scenario prepared in advance is presented by overlaying an object having a particular meaning on each image data captured for display. This cartoon-like image data is sequentially switched at every predetermined time for display.

FIGS. 14-18 represent exemplified scenes of the third game according to the embodiment of the present invention. FIGS. 19A-19F represent exemplified displays of an image when the third game is over according to the embodiment of the present invention. The following example corresponds to the case where five sub-games constitute the third game, and "a five-frame comic strip" is presented using the total of five image data captured at each sub-game.

(1) Fourth Sub-Game

Figure 14:
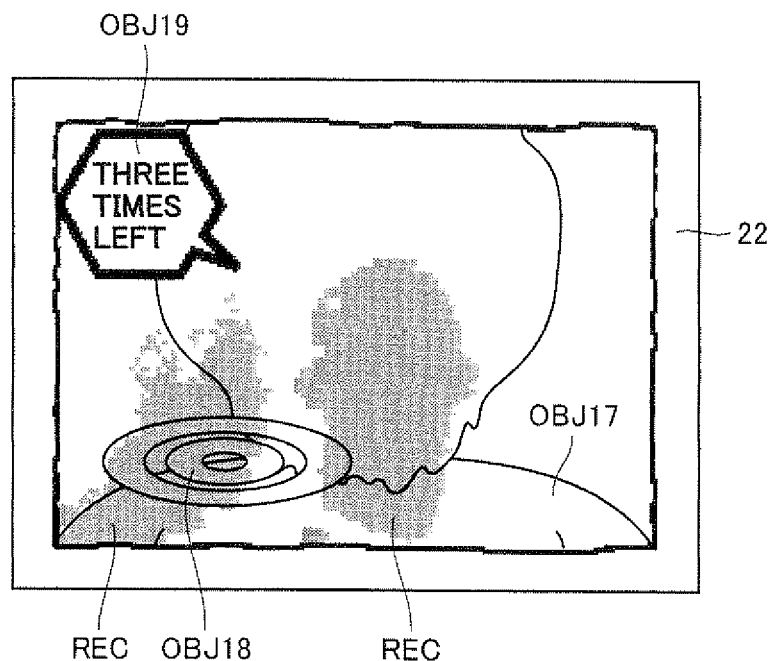
FIGS. 14, 15, 16, 17 and 18 represent an example of a scene in a third game corresponding to No. 1, No. 2, No. 3, No. 4, and No. 5, respectively, according to the embodiment of the present invention.

In the fourth sub-game included in the third game shown in FIG. 14, an object OBJ17 representing the head and the back of a person is displayed at a predetermined position on second LCD 22. The user moves his/her hands to "pat" the area corresponding to the "shoulder" of object OBJ17 according to his/her own recognized movement.

In the scene of FIG. 14, an image of the game effect (object OBJ17) is displayed at second LCD 22, bringing about together a recognition display REC representing the range of the user's hand detected by the body recognition processing on the image data obtained by inner camera 23. This recognition display REC is sequentially updated for every processing cycle of the skin tone area detection that will be described afterwards.

In the event of the user moving his/her hand up and down upon adjusting the relative position of his/her hand with respect to game device 100, the fourth sub-game attains "passing" when determination is made over several times that the user has "patted" a predetermined area of object OBJ17 (the area corresponding to the "shoulder") as a result of body recognition processing on the image data obtained by inner camera 23, When determination is made that the "shoulder" has been "patted" during the game proceeding, an object OBJ18 representing that the shoulder has been patted is displayed. Further, an object OBJ19 representing the remaining count to "pat" the shoulder required to "passing" the game is displayed at second LCD 22.

(2) Fifth Sub-Game

Figure 15:
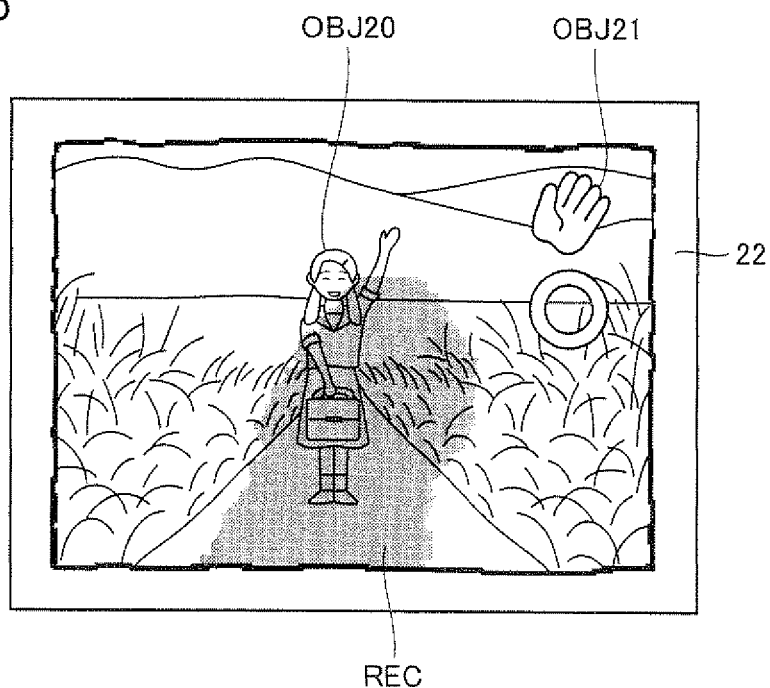

In the fifth sub-game of the third game shown in FIG. 15, an object OBJ20 representing a farewell scene is displayed at second LCD 22. The user moves his/her hand right and left to carry out a "good-bye" wave in the scene of FIG. 15.

In the scene of FIG. 15, an image of the game effect (object OBJ20) is displayed at second LCD 22, bringing about together a recognition display REC representing the range of the user's hand detected by the body recognition processing on the image data obtained by inner camera 23. This recognition display REC is sequentially updated for every processing cycle of the skin tone area detection that will be described afterwards.

In the event of the user moving his/her hand left and right upon adjusting his/her relative position to game device 100, the fifth sub-game attains "passing" when recognition is made that the user has moved his/her hand left and right for a predetermined number of times by the body recognition processing on the image data obtained by inner camera 23. During the game proceeding, an object OBJ21 prompting the user to wave his/her hand is displayed.

(3) Sixth Sub-Game

Figure 16:
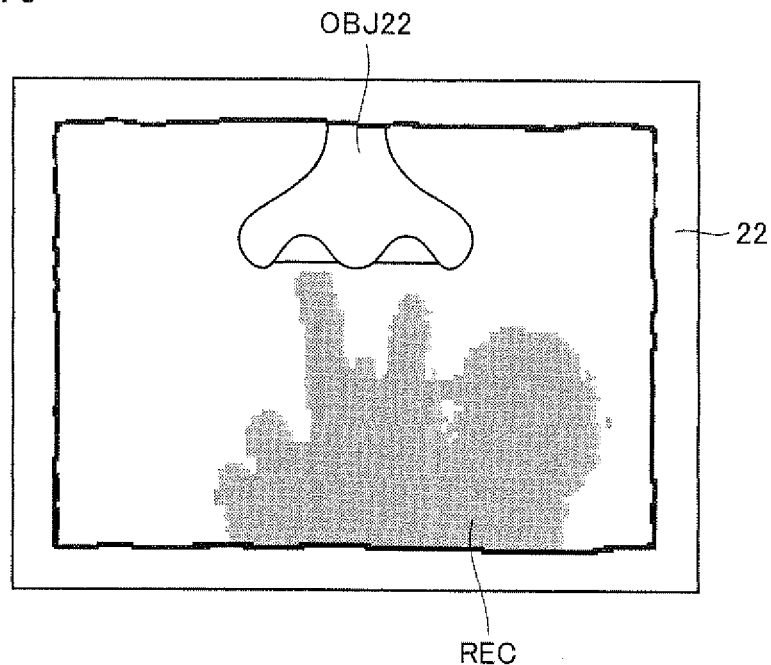

In the sixth sub-game included in the third game shown in FIG. 16, an object OBJ22 representing a "nose" is displayed at second LCD 22. The user moves his/her hand such that the player's recognized forefinger and middle finger are inserted into the position corresponding to the "nostrils" of "nose" object OBJ22.

In the scene of FIG. 16, an object of the game effect (object OBJ22) is displayed at second LCD 22, bringing about together a recognition display REC representing the range of the user's hand detected by the body recognition processing on the image data obtained by inner camera 23. This recognition display REC is sequentially updated for every processing cycle of the skin tone area detection that will be described afterwards.

In the event of the user adjusting his/her hand position upon adjusting the relative position of his/her hand with respect to game device 100 and recognition is made that the user's forefinger and middle finger are inserted into the position corresponding to the "nostrils" of object OBJ22, the sixth sub-game attains "passing".

(4) Seventh Sub-Game

Figure 17:
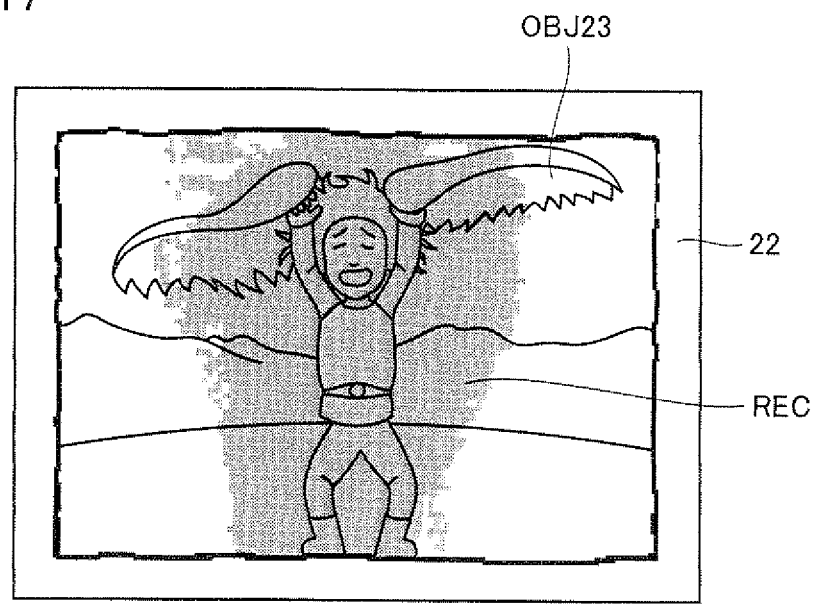

In the seventh sub-game included in the third game shown in FIG. 17, an object OBJ23 representing a character wearing a "cape" is displayed. The user moves his/her face closer to inner camera 23, and blows out his/her breath on microphone hole 16 (and microphone 43 accommodated therein) located in the proximity of inner camera 23.

In the scene of FIG. 17, an object of the game effect (object OBJ23) is displayed on second LCD 22, bringing about together a recognition display REC representing the range of the user's hand detected by the body recognition processing on the image data obtained by inner camera 23. This recognition display REC is sequentially updated for every processing cycle of the skin tone area detection that will be described afterwards.

In the event of the user blowing out his/her breath upon adjusting the relative position of his/her face with respect to game device 100, determination is made that the second sub-game attains "passing" when the recognition area of the user's face exceeds a predetermined threshold value, and the sound pressure of the user blowing out exceeds a predetermined value. When determination is made that the user has blown out his breath during the game proceeding, a scene of the displayed object OBJ23 being "blown away" is presented according to the determination.

(5) Eighth Sub-Game

Figure 18:
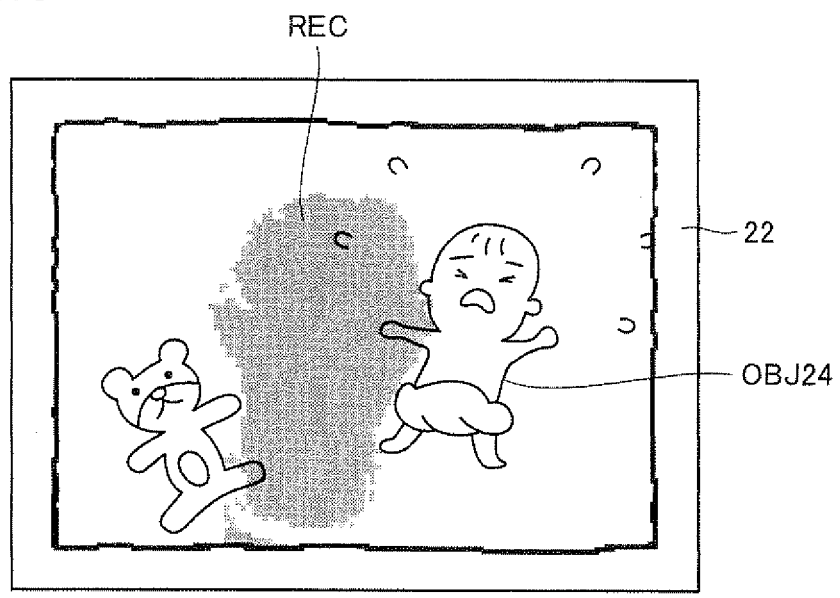

In the eighth sub-game of the third game shown in FIG. 18, an object OBJ24 representing a "crying baby" is displayed at second LCD 22. The user repeats the movement of hiding one's face with both hands and then moving both hands away from one's face, i.e. the so-called "peek-a-boo" action.

In the scene of FIG. 18, an object of the game effect (object OBJ24) is displayed at second LCD 22, bringing about together a recognition display REC representing the range of the user's hand detected by the body recognition processing on the image data obtained by inner camera 23. This recognition display REC is sequentially updated at every processing cycle of the skin tone area detection that will be described afterwards.

When repetition for a predetermined number of times of the movement of hiding and then moving away both hands from the player's face has been confirmed, determination is made that the eighth sub-game attains "passing".

(6) Exemplified Displays After Game Over

After the fourth to eighth sub-games (third game) set forth above are over, a cartoon-like presentation according to a scenario prepared in advance is presented as shown in FIGS. 19A-19F.

Figure 19A:
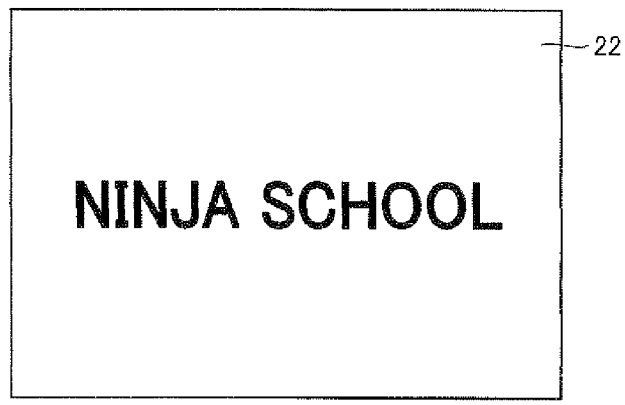
FIGS. 19A-19F represent image display examples after the third game is over according to the embodiment of the present invention.
Figure 19B:
Figure 19C:

After the third game is over, a title screen prepared in advance as shown in FIG. 19A is displayed at second LCD 22, followed by a screen as shown in FIG. 19B. In the screen of FIG. 19B, the image data captured during the play of the fourth sub-game (FIG. 14) in the third game is overlaid with an image object in line with a prepared scenario. Following the screen of FIG. 19B, the screen of FIG. 19C appears. In the screen of FIG. 19C, the image data captured during the play of the fifth sub-game (FIG. 15) in the third game is overlaid with an image object in line with the prepared scenario.

Figure 19D:
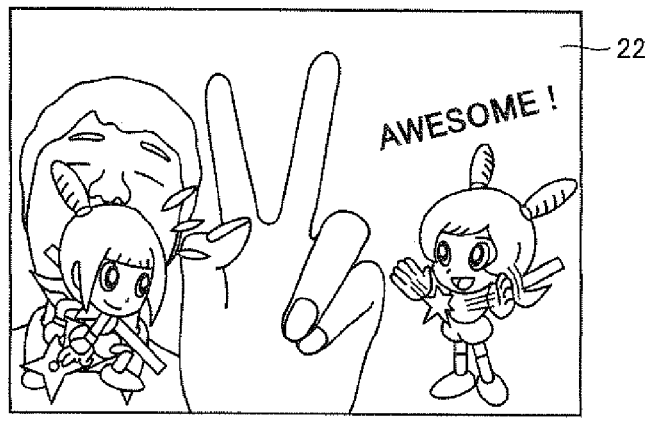
Figure 19E:
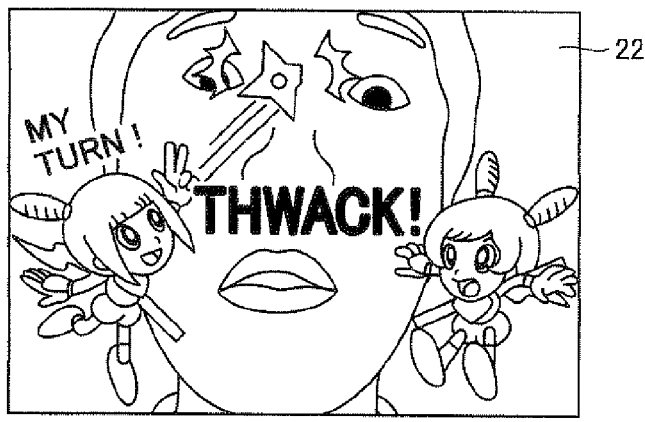
Figure 19F:
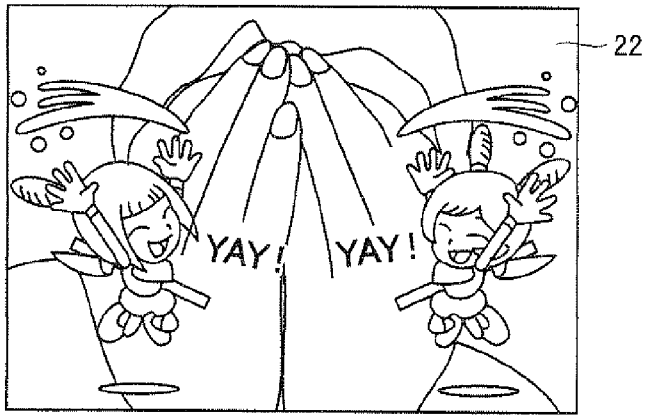

In a similar manner thereafter, the screen of FIG. 19C is followed by the sequential screens of FIGS. 19D, 19E and 19F at second LCD 22. In the screens of FIG. 19D, 19E and 19F, respective image objects in line with the scenario prepared in advance are overlaid on the image data of the user captured during playing the sixth sub-game (FIG. 16), the seventh sub-game (FIG. 17), and the eighth sub-game (FIG. 18), respectively, in the third game.

As shown in FIGS. 19A-19F, an object in line with the scenario prepared in advance is overlaid on the appearance of the user captured during the play of each of a series of sub-games for display. Accordingly, a cartoon-like image with the user playing the third game as the lead character can be enjoyed.

In the third game, the game proceeds by determining the game passing based on a passing condition associated with each of predetermined multiple phases (fourth to eighth sub-games), as shown in FIGS. 14-18 set forth above. In each sub-game, the object associated with each corresponding passing condition is switched for display.

In each of predetermined multiple phases (fourth to eighth sub-games) of the third game, the game proceeds by determining the game passing based on a passing condition corresponding to each phase(sub-game), as shown in FIGS. 19A-19F set forth above. After the third game is over, a synthesized image based on a plurality of image data obtained at each of the multiple phases (sub-games) during the game proceeding, stored in image storage unit 116, and an object associated with a passing condition corresponding to each phase (sub-game) at which the image data is obtained, is presented.

<Control Configuration>

A control configuration to present the processing set forth above will be described hereinafter.

FIG. 20 is a block diagram representing a control configuration of game device 100 according to the embodiment of the present invention.

Referring to FIG. 20, game device 100 includes, as its control configuration, a sound data buffer 102, a sound recognition unit 104, a determination unit 110, an image data buffer 112, a capture controller 114, an image storage unit 116, a body recognition unit 120, a game image controller 130, a game image DB (Data Base) 132, a recognition result reflecting unit 134, a replay controller 136, a replay image DB 138, and a rendering engine 140. The control configuration of FIG. 20 is typically implemented by CPU 31 executing a game program utilizing hardware such as main memory 32. Alternatively, all or a portion thereof may be embodied by a hard-wired circuit.

Sound data buffer 102 stores sound signals in a digital format for just a predetermined period of time. The sound signals are obtained by the D/A conversion at an I/F circuit 42 (FIG. 3) of the voice obtained through microphone 43 (FIG. 3). Sound data buffer 102 is presented as a portion of main memory 32.

Sound recognition unit 104 carries out the well-known sound recognition on the sound data stored in sound data buffer 102. Typically, sound recognition unit 104 determines whether the user in the seventh sub-game of the third game shown in FIG. 17 is blowing out his/her breath. The determination as to whether the user is blowing out can be made based on whether the sound obtained by microphone 43 is equal to or greater than a predetermined sound pressure. The recognition result by sound recognition unit 104 is delivered to determination unit 110.

Image data buffer 112 stores a predetermined number of frames of image data obtained by the camera (inner camera 23 and outer camera 25). Since inner camera 23 is basically used in each of the games set forth above, image data picked-up by inner camera 23 is stored as needed in image data buffer 112. Image data buffer 112 is presented as a portion of main memory 32. Image data buffer 112 is connected to capture controller 114 and body recognition unit 120.

Capture controller 114 is arranged between image data buffer 112 and image storage unit 116 to output the image data stored in image data buffer 112 to image storage unit 116 according to a capture instruction from determination unit 110 that will be described afterwards. During game play (during activation of inner camera 23), the image data picked up by inner camera 23 is periodically written into image data buffer 112, and the required image data thereof is selectively transferred into image storage unit 116.

Image storage unit 116 stores image data displayed after the game is over according to the present embodiment. Image storage unit 116 is presented as a portion of main memory 32 or data memory 34 for storage. The configuration may be set such that the image data stored in image storage unit 116 is to be stored in an external memory card 28 that will be attached to game device 100.

Body recognition unit 120 carries out body recognition on the image data obtained by inner camera 23, and provides the recognition result to determination unit 110. Specifically, body recognition unit 120 includes a face recognition unit 122, a color coordinate conversion unit 124, and a skin tone area detection unit 126.

Face recognition unit 122 executes face recognition processing on the image data stored in image data buffer 112. Namely, face recognition unit 122 detects, as the user's image, the face area of a person from the image data picked up. At this stage, the face feature points and the like included in the face area are also extracted. Face recognition unit 122 provides these face recognition results to determination unit 110. Specifically, the coordinate values representing the range specified at a face area, the center coordinate of the pupil, and the like are output as the detection results. The face recognition processing by face recognition unit 122 is based on well-known techniques. Details thereof will not be provided here.

Color coordinate conversion unit 124 converts the image data described in the RGB color coordinate system into the HVC color coordinate system as the preprocessing at skin tone area detection unit 126. The image data picked up by a camera has the color information of each pixel represented by the tone values of R (red), G (green), and B (blue). Color coordinate conversion unit 124 converts the color information of each pixel into the coordinate system of hue, value, and chroma.

Skin tone area detection unit 126 detects a skin tone area in the image data obtained by inner camera 23, based on the color information of the HVC coordinate system output from color coordinate conversion unit 124 (skin tone area detection processing). Namely, skin tone area detection unit 126 detects, as the user's image, a skin tone area from the image data obtained by inner camera 23. Accordingly, skin tone area detection unit 126 detects a user area representing the area of the user in the image data. Specifically, skin tone area detection unit 126 determines whether the hue, value, and chroma of each pixel are included in respective corresponding threshold ranges, and identifies a pixel included in all of the threshold ranges as "skin tone". Since the color information obtained by taking a picture of the skin area of the user varies according to the surrounding illumination environment, it is preferable to pick up an image of the user once or several times in advance to dynamically determine the threshold ranges corresponding to the skin tone based on the image data obtained by such image pick-up. Skin tone area detection unit 126 provides the skin tone area detected as set forth above (the coordinate value of each pixel and/or number of pixels determined as corresponding to skin tone) to determination unit 110.

Determination unit 110 sequentially determines whether a specific condition set for each game is satisfied or not during the game proceeding based on the recognition result from sound recognition unit 104 and body recognition unit 120 (face recognition unit 122 and skin tone area detection unit 126). In other words, determination unit 110 determines whether a condition associated with the position of an object displayed in line with the game effect during the game proceeding is satisfied or not based on the recognition result. Specifically, determination unit 110 stores a condition group 110a constituted of a plurality of conditions corresponding to each game, and selects a corresponding condition according to the game selected by the user's designation to determine whether the input recognition result satisfies the relevant condition or not. Determination unit 110 determines that the game has attained passing when a condition required for determination of passing (passing condition) for each game is satisfied.

Determination unit 110 may be configured to determine whether the game attains passing or not particularly when the user's presence is detected by skin tone area detection unit 126 and/or face recognition unit 122. The determination criterion of whether a user's presence is detected or not includes detection of a skin tone area larger than a predetermined area by skin tone area detection unit 126, detection of a face area by face recognition unit 122, and the like. By adding such conditions, the event of an erroneous determination causing the game to proceed even though the user is not present in front of game device 100 can be avoided.

Determination unit 110 determines, in addition to a passing condition to determine that the game attains passing, a condition required to output a capture instruction towards capture controller 114.

The determination result by determination unit 110 is output to game image controller 130 and recognition result reflecting unit 134. Determination unit 110 provides the recognition result from body recognition unit 120 to recognition result reflecting unit 134.

Game image controller 130 and game image DB 132 proceed with the game based on the recognition result from determination unit 110. Specifically, an image object corresponding to each of a plurality of prepared games is stored in game image DB132. Game image controller 130 provides the required image object from game image DB132 to rendering engine 140 at an appropriate timing based on the recognition result from determination unit 110. Thus, determination unit 110, game image controller 130 and game image DB132 proceed with the game based on the result of the body recognition.

Recognition result reflecting unit 134 displays the skin tone area (user's image) detected by body recognition unit 120 during game proceeding as the area recognized to be the user's face and/or hands (recognition display REC indicated in FIG. 7 and the like). Recognition result reflecting unit 134 displays the detected skin tone area as a "shadow", as shown in FIG. 7 and the like. Namely, recognition result reflecting unit 134 displays the skin tone area (user's image) detected during game proceeding in a manner different from that of the image picked-up by inner camera 23.

Replay controller 136 and replay image DB 138 provide an image display (replay operation) after the above-described game is over. Specifically, replay image DB 138 stores an image object to be overlaid on the image data after the game is over. Replay controller 136 reads out, after the game is over, the image data stored in image storage unit 116, and also a corresponding image object from replay image DB 138, as necessary, to provide both to rendering engine 140. In the case where a plurality of image data are displayed with no overlay of an image object, as shown in FIGS. 10A and 10B, replay controller 136 provides only the image data stored in image storage unit 116 to rendering engine 140.

Rendering engine 140 controls the image display at first and second LCDs 12 and 22. Specifically, rendering engine 140 provides an overlaid display of an image object from game image controller 130 on an image representing a recognized area from recognition result reflecting unit 134 during game proceeding. After the game is over, rendering engine 140 provides an overlaid display of the image data from replay controller 136 and the image object.

Figure 21:
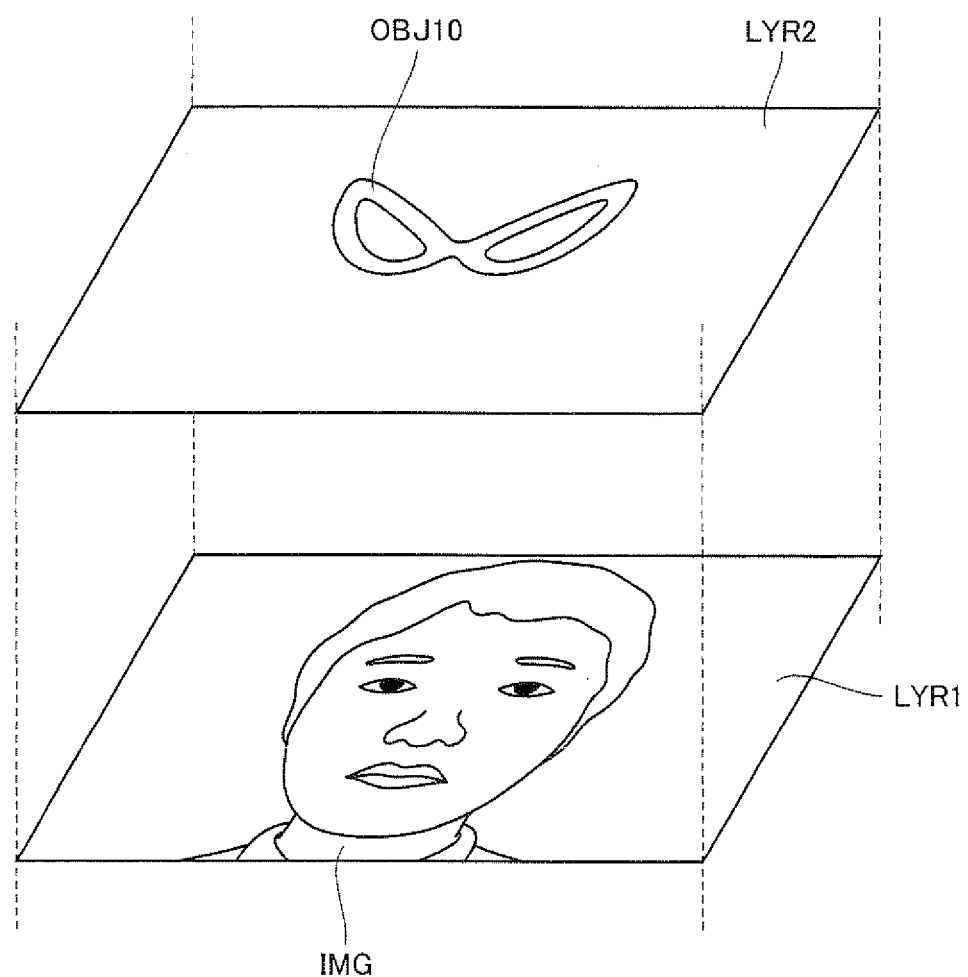
FIG. 21 schematically represents processing at the rendering engine of FIG. 20.

FIG. 21 schematically represents the processing at the rendering engine shown in FIG. 20. FIG. 21 corresponds to the case of implementing the display at second LCD 22 shown in FIG. 11B.

Referring to FIG. 21, video signals for displaying an image as first and second LCDs 12 and 22 are generated using a plurality of layers at rendering engine 140. Specifically, rendering engine 140 includes at least a first layer LYR1 for displaying image data IMG, and a second layer LYR2 for displaying an image object. Image data IMG is deployed to first layer LYR1. Object OBJ10 is deployed to second layer LYR2. Each of layers LYR1 and LYR2 is provided by forming, in the VRAM (not shown) in CPU 31, a memory area of a size sufficient for display at first LCD 12 or second LCD 22. Video signals are generated by combining layers LYR1 and LYR2.

By the deployment of the required object to second layer LYR2, the display can be presented with an arbitrary object switched during game proceeding and during display of an image based on the image data stored in image storage unit 116.

<Processing Content and Procedure of First Game>

The processing content and processing procedures to present the first game set forth above (FIGS. 7-9, and FIGS. 10A and 10B) will be described hereinafter. In the first game, the game proceeds mainly based on the position of an object displayed in line with the game effect, as well as the position and size of a skin tone area detected by skin tone area detection unit 126 (FIG. 21).

Figure 22:
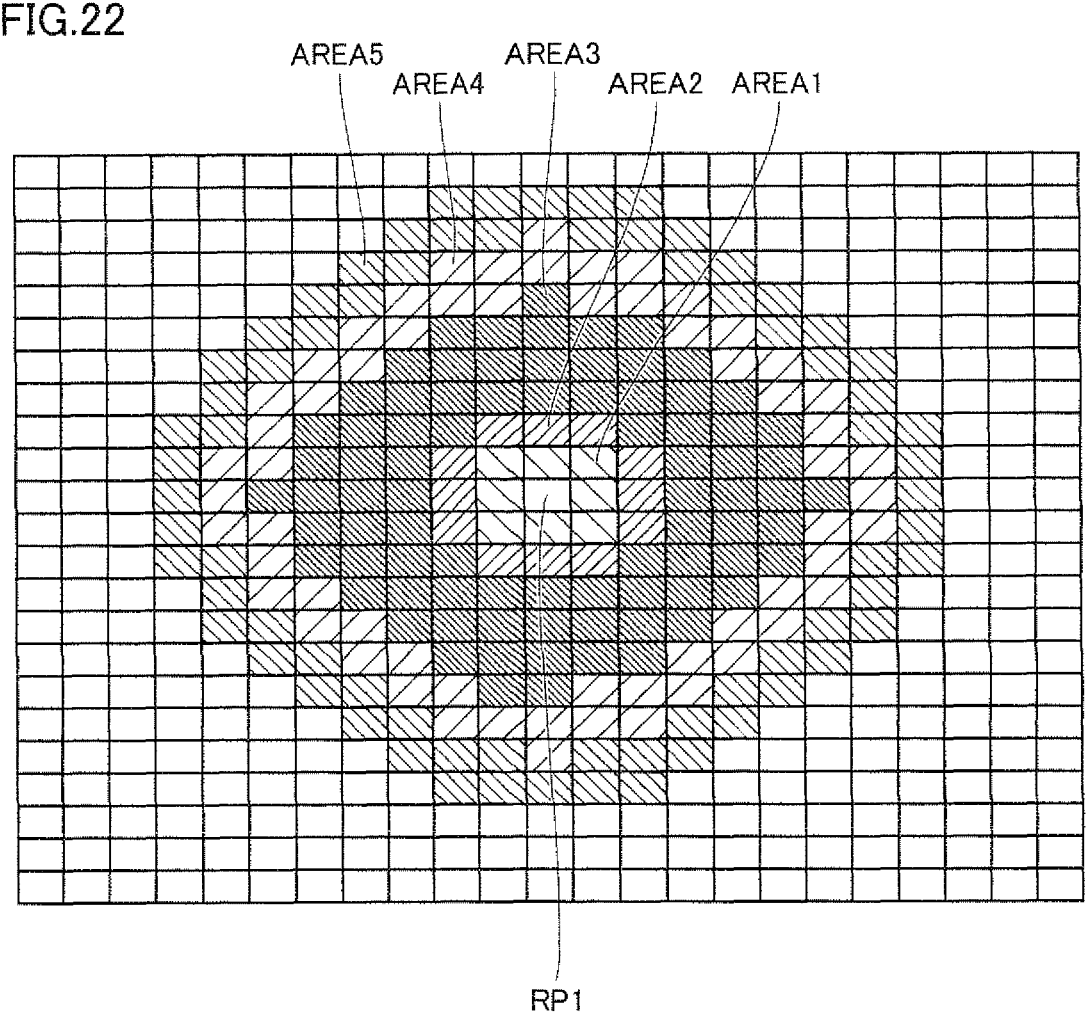
FIG. 22 is a diagram to describe a game proceeding condition of the first game according to the embodiment of the present invention.

FIG. 22 is a diagram to describe a game proceeding condition of the first game according to the present embodiment. In the first game, a plurality of determination areas AREA1-AREA5 sectionalized concentrically about a reference point RP1 set for image data obtained by inner camera 23 are defined corresponding to the position of an object displayed at second LCD 22 shown in FIGS. 7-9. The number of pixels (ratio) qualified as "skin tone" among the pixels included in determination areas AREA1-AREA5 is taken as a condition for game proceeding.

Specifically, in the first game, the game progress is separated to the first phase to the fifth phase. The ratio of the number of pixels qualified as "skin tone" among the pixels in each of determination areas AREA1-AREA5 to the total number of pixels in the corresponding determination area is calculated. Each phase proceeds to the next phase on the condition that the calculated ratio exceeds each relevant threshold value. This is because the first game is based on the assumption that the user will gradually move his/her face closer to game device 100, and that the number of pixels qualified as "skin tone" will gradually increase in accordance with the user's movement.

Following the start of the first game, determination is made as to whether the ratio of the number of pixels qualified as "skin tone" from the pixels in determination area AREA1 to the total number of pixels in determination area AREA1 exceeds a predetermined threshold value Th1 or not. When this ratio exceeds threshold value Th1, the game proceeds to the second phase. At the second phase, determination is continuously made as to whether the ratio of the number of pixels qualified as "skin tone" from the pixels in determination area AREA2 to the total number of pixels in determination area AREA2 exceeds a predetermined threshold value Th2 or not. The game proceeds to the third phase when determination is made that the ratio exceeds threshold value Th2.

In a similar manner at the third phase, determination is continuously made as to whether the ratio of the number of pixels qualified as "skin tone" from the pixels in determination area AREA3 to the total number of pixels in determination area AREA3 exceeds a predetermined threshold value Th3 or not. The game proceeds to the fourth phase when determination is made that the ratio exceeds threshold value Th3. At the fourth phase, determination is continuously made as to whether the ratio of the number of pixels qualified as "skin tone" from the pixels in determination area AREA4 to the total number of pixels in determination area AREA4 exceeds a predetermined threshold value Th4 or not. When the ratio exceeds threshold value Th4, the game proceeds to the fifth phase. At the subsequent fifth phase, determination is made as to whether the ratio of the number of pixels qualified as "skin tone" from the pixels in determination area AREA5 to the total number of pixels in determination area AREA5 exceeds a predetermined threshold value Th5 or not. When the ratio exceeds threshold value Th5, the game attains "passing".

Each of threshold values Th1-Th5 is preferably set to at least 50%. Although the description set forth above corresponds to the case where determination is made based on the ratio of the number of pixels qualified as "skin tone" for each determination area, the absolute number of pixels qualified as "skin tone" may be employed for the determination criterion instead.

Thus, determination is made as to whether a condition is satisfied or not based on pixels included in a corresponding determination area. Accordingly, the event of an erroneous determination of the first game attaining "passing" immediately as a result of detection differing from the essentially expected movement of the user, for example in the case where there are many pixels qualified as "skin tone" in a more outer determination area even though the number of pixels qualified as "skin tone" in an inner determination area is low, right after starting the first game, can be avoided.

The game effect is modified according to the game proceeding phase. For example, an image object as shown in FIG. 7 is displayed in the first to third phases. At the timing of transition from the third phase to the fourth phase, the display is switched to an image object as shown in FIG. 8. Further, when determination is made that the condition at the fifth phase is satisfied and the game attains "passing", the display is switched to an image object such as those shown in FIGS. 10A and 10B.

In each game of the present embodiment, the appearance of the user in the act of playing a game is captured at the timing of a predetermined condition being satisfied. In the first game, image data obtained by inner camera 23 is captured at the timing of the conditions corresponding to the first to fifth phases set forth above being satisfied. Specifically, the captured image data will include the appearance of the user around the timing of phase transition during the game proceeding.

The position of reference point RP1 and determination areas AREA1-AREA5 are modified appropriately depending upon the position of an object displayed for the game effect.

In the first game, by determining "passing" at each of a predetermined number of phases based on a passing condition set in correspondence with each phase, the game proceeds. When the first game is over, a plurality of image data obtained at each of the multiple phases during game proceeding and stored in image storage unit 116 are displayed continuously.

Figure 23:
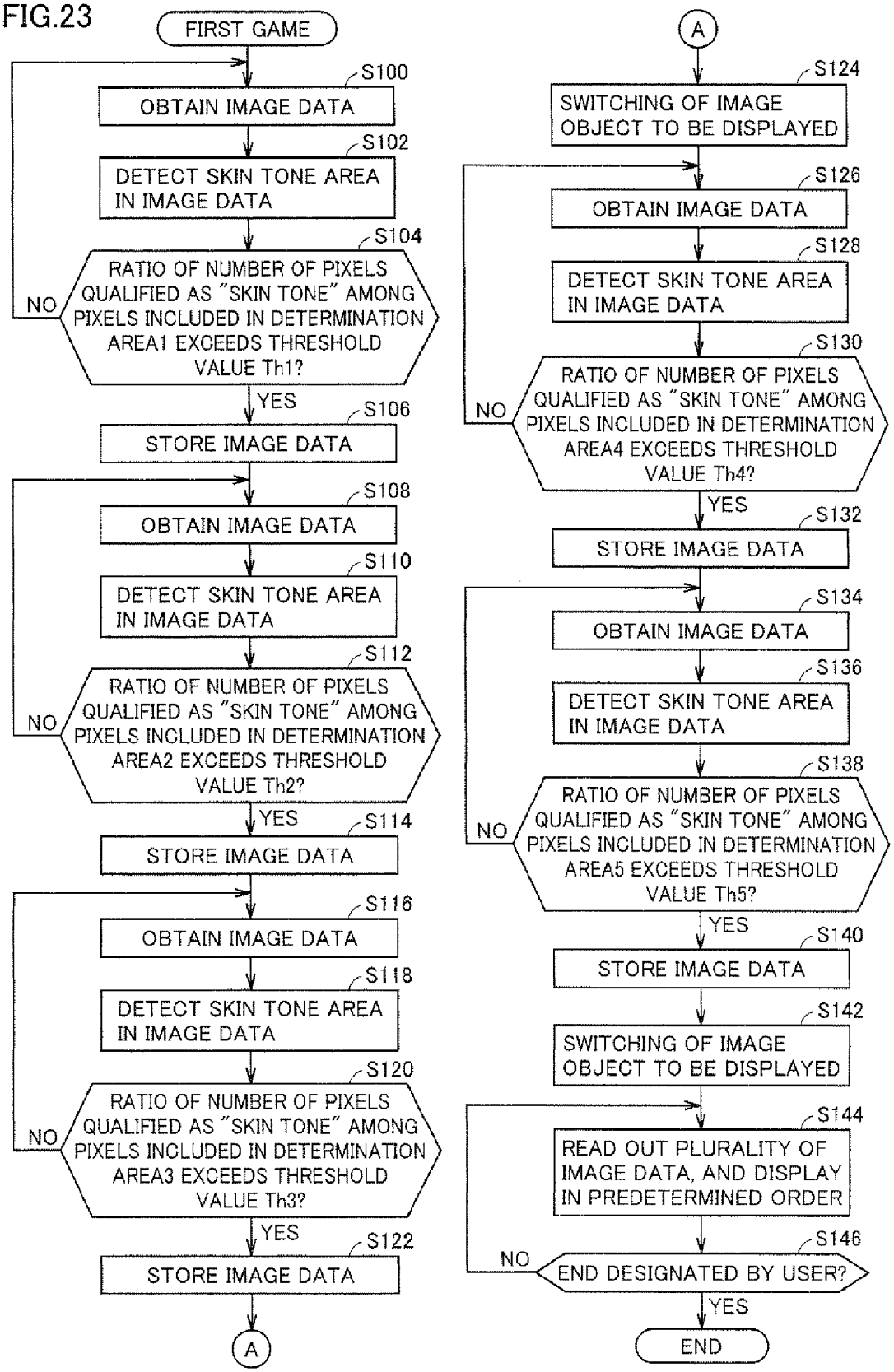
FIGS. 23 and 24 are flowcharts of procedures of the first game and second game, respectively, according to the embodiment of the present invention.

FIG. 23 is a flowchart representing the processing procedure of the first game according to the embodiment of the present invention. The flowchart of FIG. 22 is executed upon designation of starting the first game by the user.

Referring to FIG. 23, at step S100, CPU 31 obtains image data picked up by inner camera 23. Then at step S102, CPU 31 detects the skin tone area in the obtained image data. At a subsequent step S104, CPU 31 determines whether the ratio of the number of pixels qualified as "skin tone" among the pixels in determination area AREA1 shown in FIG. 22 to the total number of pixels in determination area AREA1 exceeds threshold value Th1 or not. When this ratio does not exceed threshold value Th1 (NO at step S104), the processing of step S100 is repeated. In the case where the ratio exceeds threshold value Th1 (YES at step S104), control proceeds to step S106.

At step S106, CPU 31 stores the most recently obtained image data in main memory 32 or data memory 34. In other words, CPU 31 captures an appearance of the user in the act of playing a game. Then, control proceeds to step S108. Namely, the first game proceeds from the first phase to the second phase.

At step S108, CPU 31 obtains image data picked up by inner camera 23. At step S110, CPU 31 detects a skin tone area among the obtained image data. At the next step S112, CPU determines whether the ratio of the number of pixels qualified at "skin tone" from the pixels in determination area AREA2 shown in FIG. 22 to the total number of pixels in determination area AREA2 exceeds a threshold value Th2 or not. When the ratio does not exceed threshold value Th2 (NO at step S112), the processing at step S108 is repeated. When the ratio exceeds threshold value Th2 (YES at step S112), control proceeds to step S114.

At step S114, CPU 31 stores the most recently obtained image data in main memory 32 or data memory 34. In other words, CPU 31 captures an appearance of the user in the act of playing a game. Then, control proceeds to step S116. Namely, the first game proceeds from the second phase to the third phase.

At step S116, CPU 31 obtains image data picked up by inner camera 23. At step S118, CPU 31 detects a skin tone area among the obtained image data. At the next step S120, CPU 31 determines whether the ratio of the number of pixels qualified at "skin tone" from the pixels in determination area AREA3 shown in FIG. 22 to the total number of pixels in determination area AREA3 exceeds a threshold value Th3 or not. When the ratio does not exceed threshold value Th3 (NO at step S120), the processing at step S116 is repeated. When the ratio exceeds threshold value Th3 (YES at step S120), control proceeds to step S122.

At step S122, CPU 31 stores the most recently obtained image data in main memory 32 or data memory 34. In other words, CPU 31 captures an appearance of the user in the act of playing a game. At a following step S124, CPU 31 switches the image object to be displayed from the image object of FIG. 7 to the image object of FIG. 8. Then, control proceeds to step S126. The first game proceeds from the third phase to fourth phase.

At step S126, CPU 31 obtains image data picked up by inner camera 23. At following step S128, CPU 31 detects the skin tone area in the obtained image data. At a subsequent step S130, CPU 31 determines whether the ratio of the number of pixels qualified as "skin tone" from the pixels in determination area AREA4 shown in FIG. 22 to the total number of pixels in determination area AREA4 exceeds a threshold value Th4 or not. When the ratio does not exceed threshold value Th4 (NO at step S130), the processing of step S126 is repeated. When the ratio exceeds threshold value Th4 (YES at step S130), control proceeds to step S132.

At step S132, CPU 31 stores the most recently obtained image data in main memory 32 or data memory 34. Namely, CPU 31 captures an appearance of the user in the act of playing a game. Then, control proceeds to step S134. The first game proceeds from the fourth phase to the fifth phase.

At step S134, CPU 31 obtains image data picked up by inner camera 23. At next step S136, CPU 31 identifies a skin tone area in the obtained image data. At a further following step S138, CPU 31 determines whether the ratio of the number of pixels qualified as "skin tone" from the pixels in determination area AREA5 shown in FIG. 22 to the total number of pixels in determination area AREA5 exceeds a threshold value Th5 or not. When the ratio does not exceed threshold value Th5 (NO at step S138), the processing of steps S134 and et seq. is repeated. When the ratio exceeds threshold value Th5 (YES at step S138), control proceeds to step S140.

At step S140, CPU 31 stores the most recently obtained image data in main memory 32 or data memory 34. In other words, CPU 31 captures an appearance of the user in the act of playing a game. At a subsequent step S142, CPU 31 switches the image object to be displayed from the image object of FIG. 8 to the image object of FIG. 9. Then, control proceeds to step S144. Namely, determination is made that the first game attains "passing", and the proceeding of the first game ends.

In the case where the series of processing from step S100 to S142 set forth above does not end within a predetermined time, determination may be made that the first game ends as "fail". In this case, a screen indicating "fail" in the first game may be displayed instead of the processing of steps S144 and et seq.

At step S144, CPU 31 reads out the plurality of captured image data from main memory 32 or data memory 34 to provide display sequentially switched at second LCD 22 in a predetermined order. Namely, CPU 31 provides a replay-display of the user in the act of playing a game. The displaying order of the image data may be in the captured time sequence, or a random sequence independent of the captured time sequence.

At a following step S146, CPU 31 determines whether "end" has been designated by the user. When the user has not designated "end" (NO at step S146), the processing of step S144 is repeated. When "end" is designated by the user (YES at step S146), the processing of the first game ends.

<Processing Content and Procedure of Second Game>

The second game of the present embodiment includes a plurality of sub-games. At each sub-game, an appearance of the user in the act of playing a game is captured, concurrently with the game proceeding. When the series of sub-game ends, the image data captured at each sub-game is displayed with various objects overlaid.

(1) Entire Processing

Figure 24:
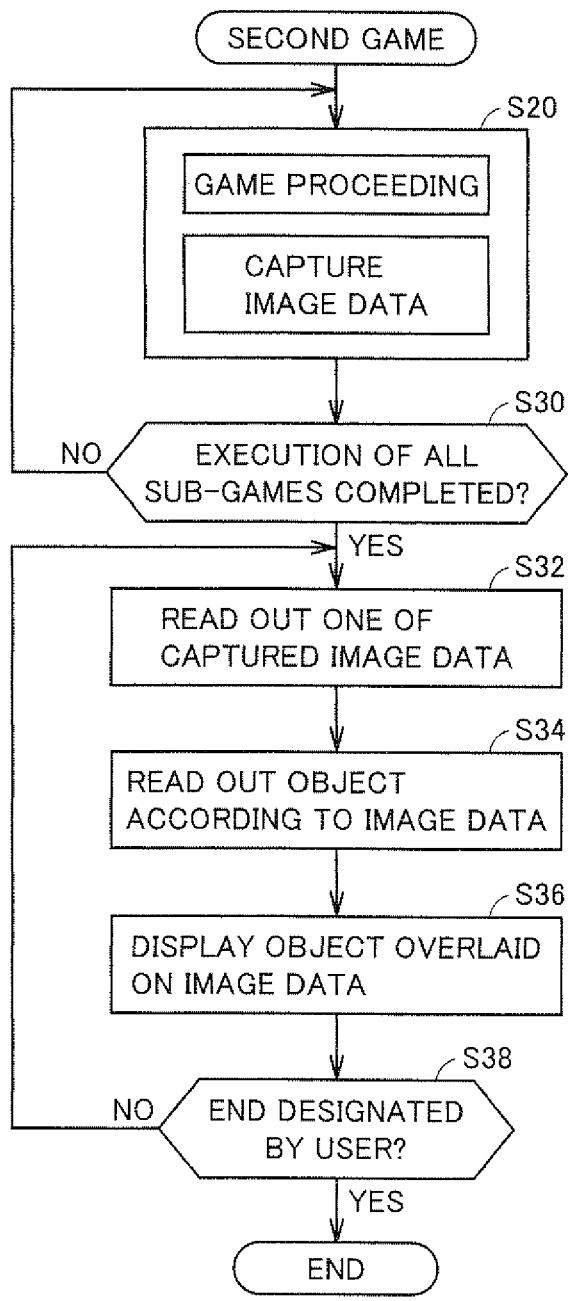

FIG. 24 is a flowchart of the processing procedure of the second game according to the embodiment of the present invention. The flowchart of FIG. 24 is executed when the user designates the start of the second game.

Referring to FIG. 24, at step S20, CPU 31 executes a sub-game. In the executed sub-game, the game proceeding and capture of image data are executed concurrently. At a subsequent step S30, CPU 31 determines whether execution of all the prepared sub-games is completed or not. When execution of all the sub-games has not yet been completed (NO at step S30), the processing of step S20 is repeated. Namely, the processing of step S20 is repeated for the number of prepared sub-games. When execution of all the sub-games is completed (YES at step S30), i.e. when the second game is over, control proceeds to the replay processing of steps S32 and et seq.

At step S32, CPU 31 reads out one image data from all the image data captured in each of the previous sub-games. At a subsequent step S34, CPU 31 reads out an object corresponding to the read image data. At a further subsequent step S32, CPU 31 provides a display with the object read out at step S34 overlaid on the image data read out at step S32. At an elapse of a predetermined time, control proceeds to step S38.

At step S38, CPU 31 determines whether the user has designated "end" or not. When the user has not designated "end" (NO at step S38), the process of step S32 is repeated. When the user has designated "end" (YES at step S38), the processing of the second game is over.

The processing content and procedure to present the first to third sub-games included in the second game (FIGS. 11A, 11B, 12A, 12B, 13A and 13B) will be described hereinafter.

(2) First Sub-Game

In the first sub-game of the second game, the game proceeds mainly based on the position of an object displayed in line with the game effect, and the position of the face feature point(s) detected by face recognition unit 122 (FIG. 21). Specifically, determination is made as to whether a condition related to game proceeding is satisfied or not based on the center coordinate of each "pupil" among the face feature points detected by face recognition unit 122.

Figure 25:
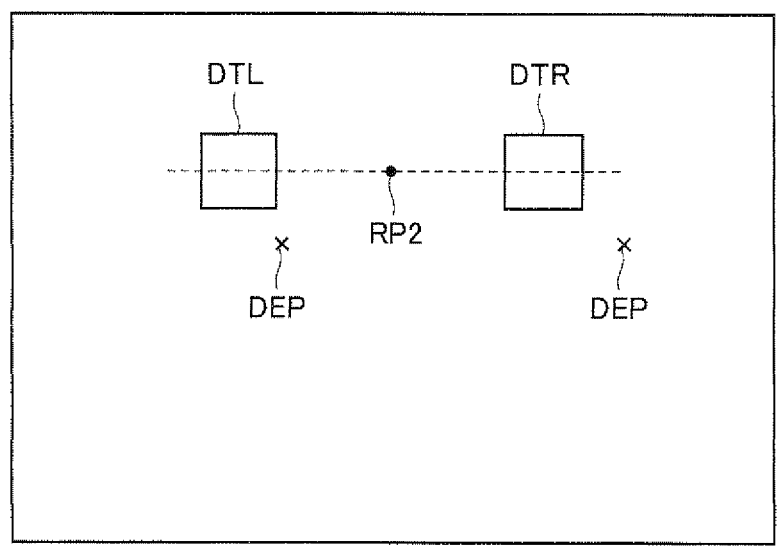
FIG. 25 is a diagram to describe a game proceeding condition of a first sub-game included in the second game according to the embodiment of the present invention.

FIG. 25 is a diagram to describe a game proceeding condition of the first sub-game included in the second game according to the embodiment of the present invention. Referring to FIG. 25, in the first sub-game, a reference point RP2 is set for the image data obtained by inner camera 23 corresponding to the center point of "glasses" object OBJ1 displayed at second LCD 22 shown in FIG. 11A. Determination areas DTL and DTR are set symmetrically in the horizontal direction about reference point RP2. Determination areas DTL and DTR are set so as to correspond to the lens area of "glasses" object OBJ10. Although determination areas DTL and DTR are indicated as rectangular areas in FIG. 25, the area may take the shape of a circle or an ellipsis. Further, the consistency degree of the values of the center coordinate of the "pupil" detected at each of determination areas DTL and DTR is taken as the game proceeding condition.

Specifically, in the first sub-game, determination is made as to whether a center coordinate DEP of a recognized "pupil" is included in each of determination areas DTL and DTR for every determination cycle. A predetermined score is added when included, and a predetermined score is subtracted when not included. The first sub-game attains "passing" at the point of time of the accumulated score exceeding a predetermined threshold value.

In the first sub-game of the second game, a plurality of intermediate threshold values are preset from the initial value (typically, zero) to a threshold value corresponding to the determination of "passing". An appearance of the user in the act of playing a game is captured at the timing of the accumulated score exceeding these intermediate threshold values. Typically, the five threshold values of Th11, Th12, Th13, Th14, and Th15 (where Th1<Th12<Th13<Th14<Th15) are preset. Image data is captured at the timing of the accumulated score exceeding each threshold value. When the accumulated score exceeds threshold value Th5, the first sub-game attains "passing". Therefore, the captured image data will include an appearance of the user taken at the timing of the accumulated score exceeding each of the threshold values.

The position of reference point RP2 as well as the position and size of determination areas DTL and DTR are appropriately modified according to the type and position of the object displayed in line with the game effect.

Figure 26:
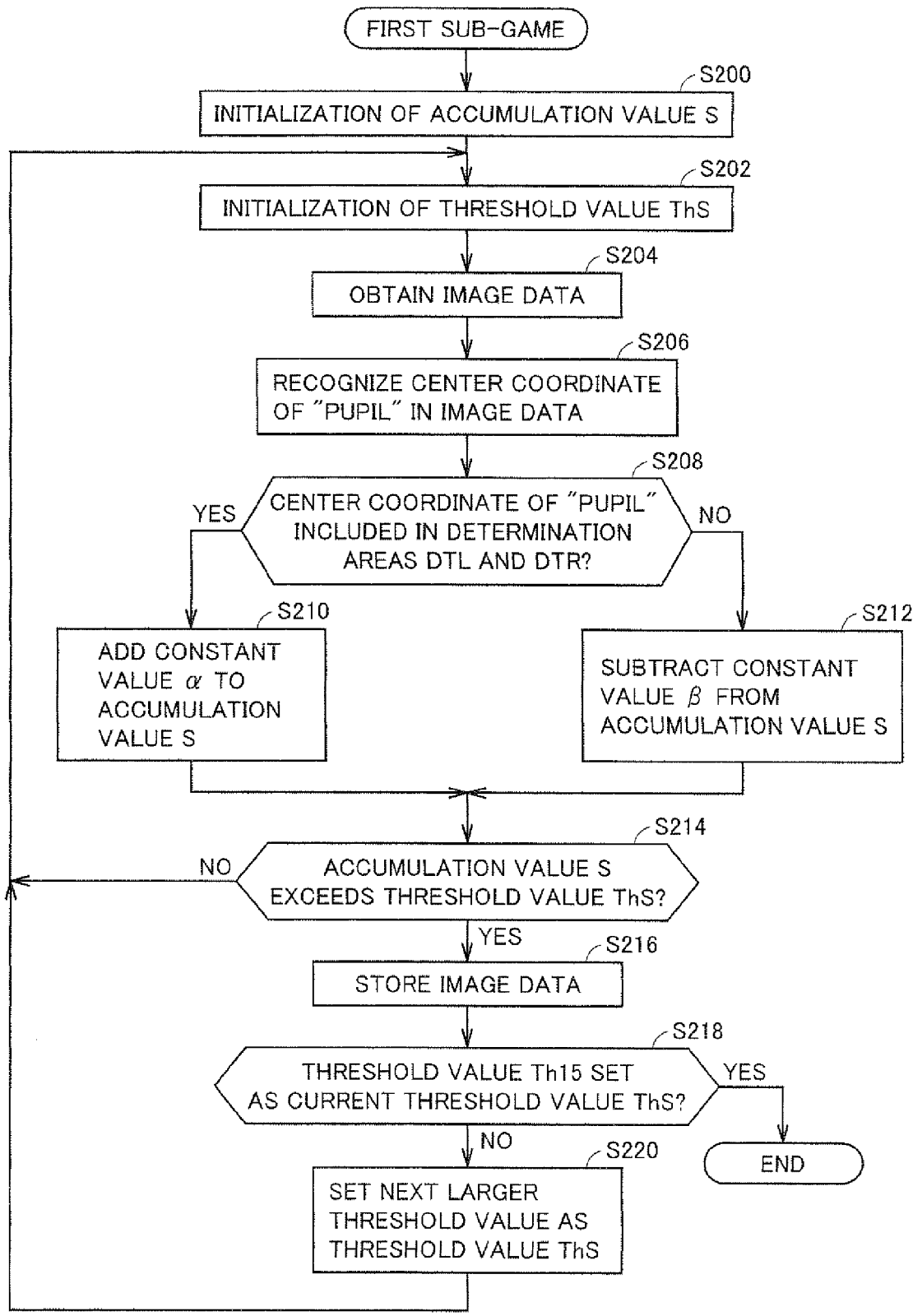
FIG. 26 is a flowchart of procedures of the first sub-game included in the second game according to the embodiment of the present invention.

FIG. 26 is a flowchart of the processing procedure of the first sub-game in the second game according to the present embodiment.

Referring to FIG. 26, at step S200, CPU 31 initializes accumulation value S (accumulation value S is set to "zero"). At next step S202, CPU 31 initializes threshold value ThS (threshold value ThS is set to the lowest threshold value Th11).

At step S204, CPU 31 obtains image data picked up by inner camera 23. At a subsequent step S206, CPU 31 recognizes the center coordinate of each of the left and right "pupil" in the obtained image data. At a further step S208, determination is made as to whether the center coordinate of each recognized left and right "pupil" is included in determination area DTL and DTR or not (FIG. 25). When the center coordinate of the left and right "pupil" is included in determination areas DTL and DTR (YES at step S208), a constant value α is added to accumulation value S (step S210). When the center coordinate is not included in determination areas DTL and DTR (NO at step S208), a constant value β is subtracted from accumulation value S (step S212). Then, control proceeds to step S214.

At step S214, CPU 31 determines whether accumulation value S exceeds threshold value ThS. When accumulation value S does not exceed threshold value ThS (NO at step S214), the processing of steps S202 and et seq. is repeated. When accumulation value S exceeds threshold value ThS (YES at step S214), control proceeds to step S216.

At step S216, CPU 31 stores the most recently obtained image data in main memory 32 or data memory 34. Namely, CPU 31 captures an appearance of the user in the act of playing a game. Then at a subsequent step S218, CPU 31 determines whether threshold value Th15 that is the highest threshold value is set as the current threshold value ThS. When threshold value Th15 is not set as current threshold value ThS (NO at step S218), CPU 31 sets a threshold value that is the next larger threshold value with respect to the currently set threshold value, as threshold value ThS (step S220). Then, the processing of steps S202 and et seq. is repeated.

When threshold value Th15 is set as current threshold value ThS (YES at step S218), determination is made that the first sub-game attains "passing", and the proceeding of the first sub-game ends.

In the case where the series of processing from steps S200 to S220 does not end within a predetermined time, determination may be made that the first sub-game ends as "fail". Further, it is preferable to have the lowest value of accumulation value S set (for example, to "zero").

(3) Second Sub-Game

In the second sub-game of the second game, the game proceeds mainly based on the position of an object displayed in line with the game effect, and the position and size of a skin tone area detected by skin tone area detection unit 126 (FIG. 21).

Figure 27:
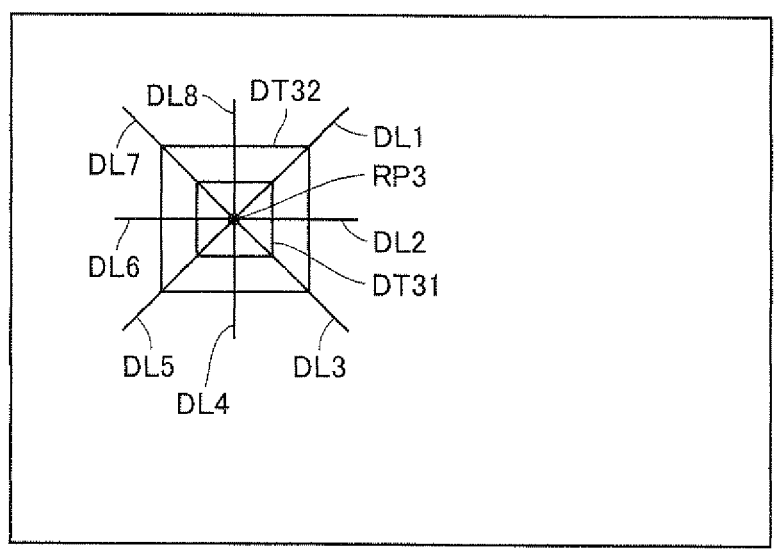
FIG. 27 is a diagram to describe a game proceeding condition of a second sub-game included in the second game according to the embodiment of the present invention.

FIG. 27 is a diagram to describe the game proceeding condition for the second sub-game in the second game of the present invention. Referring to FIG. 27, in the second sub-game, a reference point RP3 is set to the image data obtained by inner camera 23 corresponding to the center point of "mosquito" object OBJ11 displayed at second LCD 22 shown in FIG. 12A. A determination area DT31 including reference point RP3 is set about reference point RP3 In addition, a determination area DT32 including reference point RP3 is set over a range larger than that of determination area DT31. Moreover, determination lines DL1-DL8 in the total of 8 directions, i.e. upward, downward, leftward, rightward, and respective diagonal directions, are set with reference point RP3 as the starting point. The number of pixels (ratio) qualified as "skin tone" among the pixels in determination areas DT31 and DT31 as well as determination lines DL1-DL8 is taken as the game proceeding condition.

Namely, determination is made that the second sub-game attains "passing" when all the conditions of (i)-(iii) set forth below are satisfied.

(i) The ratio of the number of pixels qualified as "skin tone" among the pixels in determination area DT32 to the total number of pixels in determination area DT32 exceeds a predetermined threshold value Th32;

(ii) The ratio of the number of pixels qualified as "skin tone" among the pixels on determination lines DL1-DL8 to the total number of pixels on determination lines DL1-DL8 all exceed a predetermined threshold value Th33;

(iii) The number of pixels qualified as "skin tone" among the pixels in determination area DT31 to the total number of pixels in determination area DT31 exceeds a predetermined threshold value Th31.

The conditions of (i) and (ii) serve to determine that the user's "hands" is located in the proximity of the displayed "mosquito" object OBJ11. The condition of (iii) serves to avoid erroneous recognition of the user's face or the like as the "hands".

In the second sub-game, image data is obtained periodically, and only a predetermined number of image data from the latest obtained ones are accumulated. Obtaining (updating) the image data is discontinued at the timing of "passing" the second sub-game. Therefore, an appearance of the playing user over a predetermined period preceding the "passing" timing of the second sub-game can be captured.

The position of reference point RP3 and the size of determination areas DT31 and DT32 are modified appropriately depending upon the position and number of objects displayed in line with the game effect.

Figure 28:
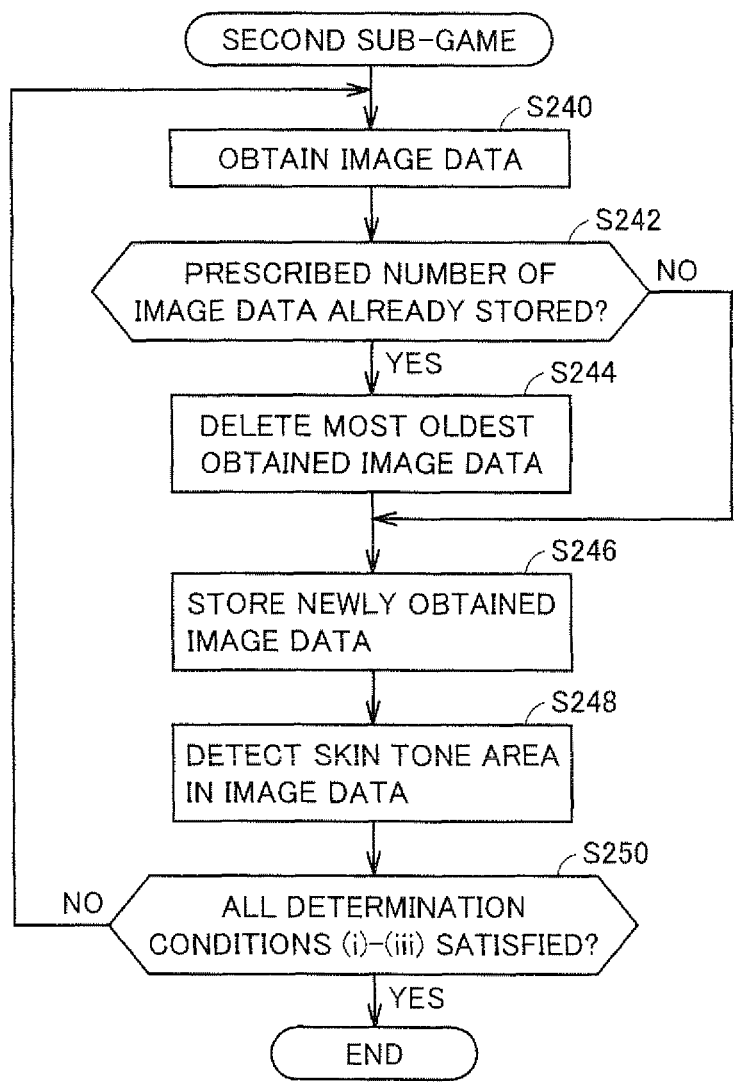
FIG. 28 is a flowchart of procedures of the second sub-game included in the second game according to the embodiment of the present invention.

FIG. 28 is a flowchart of the processing procedure of the second sub-game in the second game according to the embodiment of the present invention.

Referring to FIG. 28, at step S240, CPU 31 obtains image data picked up by inner camera 23. At the next step S242, CPU 31 determines whether a predetermined number of image data is already stored in main memory 32 or data memory 34. When a prescribed number of image data is not yet stored (NO at step S242), control proceeds to step S246. When the prescribed number of image data is already stored (YES at step S242), CPU 31 deletes the oldest obtained image data among the image data already stored (step S244), and stores the newly obtained image data into main memory 32 or data memory 34 (step S246). Then, control proceeds to step S248.

At step S248, CPU 31 identifies a skin tone area in the obtained image data. At the next step S250, CPU 31 determines whether all of the determination conditions (i)-(iii) set forth above are satisfied or not. When any one of the determination conditions (i)-(iii) is, not satisfied (NO at step S250), the processing of steps S250 and et seq. is repeated. When all conditions are satisfied (YES at step S250), determination is made that the second sub-game attains "passing", and the processing of the second sub-game ends.

(4) Third Sub-Game

In the third sub-game of the second game, the game proceeds mainly based on the position of an object displayed in line with the game effect and the position of a face area detected by face recognition unit 122 (FIG. 21).

Figure 29:
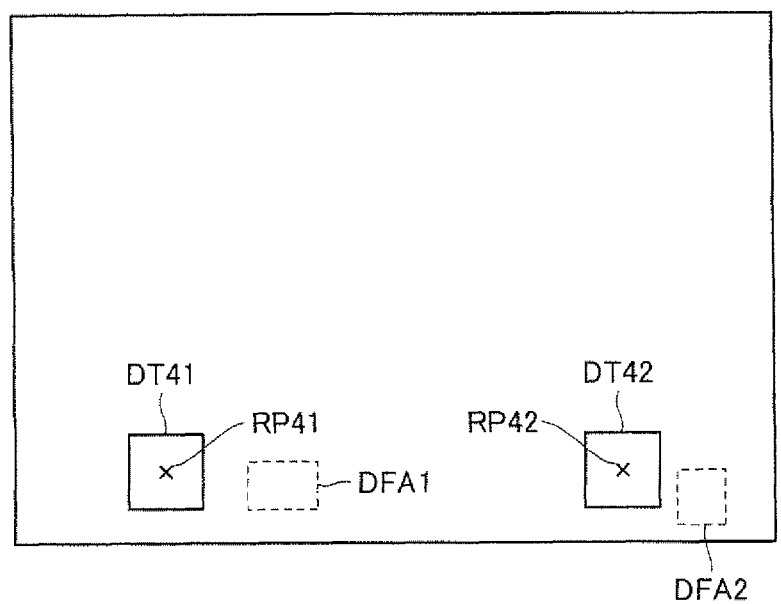
FIG. 29 is a diagram to describe a game proceeding condition of a third sub-game included in the second game according to the embodiment of the present invention.

FIG. 29 is a diagram to describe the game proceeding condition of the third sub-game in the second game according to the embodiment of the present invention. Referring to FIG. 29, in the third sub-game, a reference point RP41 and a reference point RP42 are set for the image data obtained by inner camera 23, corresponding to the cutout area of "totem pole" objects OBJ14 and OBJ15, respectively, displayed at second LCD 22 of FIG. 13A. A determination area DT41 including and centered about reference point RP41, and a determination area DT42 including and centered about reference point RP42, are set. Determination is made as to whether recognized face areas DFA1 and DFA2 are included in determination areas DT41 and DT42, respectively. A predetermined score is added when included, and a predetermined score is subtracted when not included. As a result, the third sub-game attains "passing" at the point of time of the accumulation value exceeding a predetermined threshold value.

In other words, determination of the third sub-game attaining "passing" is made when it can be determined that the user's face is located in each of the cutout area of "totem pole" objects OBJ14 and OBJ15.

In the third sub-game of the second game, image data is obtained periodically, and only a predetermined number of image data from the latest obtained ones are accumulated. Obtaining (updating) the image data is discontinued at the timing of "passing" the third sub-game. Therefore, an appearance of the playing user over a predetermined period preceding the "passing" timing of the third sub-game can be captured.

The position of reference points RP41 and RP42 and the size of determination areas DT41 and DT42 are modified appropriately depending upon the position and number of objects displayed in line with the game effect.

The processing procedure of the third sub-game in the second game is similar to the processing procedure of the first sub-game set forth above in FIG. 26. Therefore, detailed description will not be repeated.

<Processing Content and Procedure of Third Game>

The third game according the present embodiment includes a plurality of sub-games executed in series. In each sub-game, at least one picture of the user in the act of playing a game is captured at the timing of a predetermined condition being satisfied, concurrently with the game proceeding. When the series of sub-games is over, display is provided with an object having a particular meaning overlaid on each captured image data, presenting a cartoon-like representation in line with a scenario prepared in advance.

According to game device 100 of the present embodiment, a plurality of scenarios are prepared in advance, and a plurality of sub-games are executed in a predetermined order in line with one scenario selected at every execution of the third game.

In each sub-game, determination is made as to whether the game proceeding condition is satisfied or not based on the result of body recognition processing (skin tone area detection processing and face recognition processing). The conditions for game proceeding are identical to or similar to those in each of the sub-games included in the second game set forth above. Therefore, detailed description thereof will not be repeated.

Figure 30:
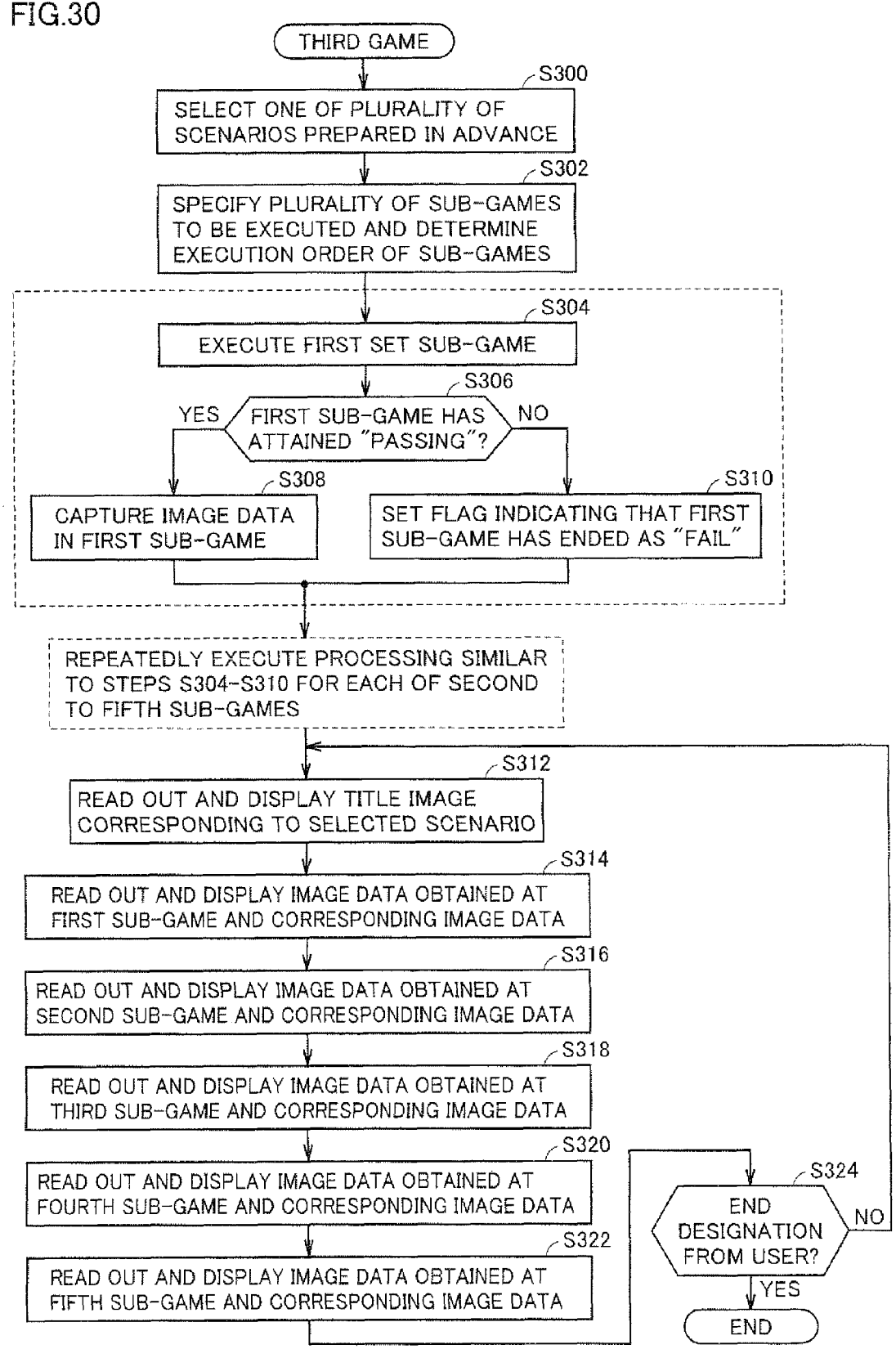
FIG. 30 is a flowchart of procedures of a third game according to the embodiment of the present invention.

FIG. 30 is a flowchart of the processing procedure of the third game according to the embodiment of the present invention. The flowchart of FIG. 30 is executed when the start of the third game is designated by the user.

Referring to FIG. 30, at step S300, CPU 31 randomly selects one scenario among a plurality of scenarios prepared in advance. At step S302, CPU 31 identifies a plurality of sub-games to be executed in line with the scenario selected at step S300 and the execution order of the sub-games. Then, control proceeds to step S304.

At step S304, CPU 31 executes the first set sub-game. CPU 31 carries on the sub-game based on the result of body recognition processing (skin tone area detection processing and face recognition processing). At a following step S306, CPU 31 determines whether the first sub-game attains "passing". When the first sub-game has attained "passing" (YES at step S306), CPU 31 captures the image data in the first sub-game (step S308). When the first sub-game did not attain "passing" (NO at step S306), CPU 31 sets a flag indicating that the first sub-game has ended as "fail" (step S310).

Processing steps similar to those of steps S304-S310 are executed repeatedly for each of the second to fifth sub-games. When the series of sub-games ends, control proceeds to step S312.

At step S312, CPU 31 reads out and displays a title image corresponding to the selected scenario (refer to FIG. 19A). At a following step S314, CPU 31 reads out and displays the image data obtained at the first sub-game and the corresponding image object (refer to FIG. 19B). In the case where a flag indicating that the relevant sub-game has ended as "fail", CPU 31 provides a display of an image indicating that the game has failed.

At a subsequent step S316, CPU 31 reads out and displays image data and a corresponding object image obtained in the second sub-game (refer to FIG. 19C). In a similar manner, at steps S318-S322, CPU 31 sequentially reads out and displays image data and corresponding image object obtained at each of third to fifth sub-games (refer to FIGS. 19D-19F).

At a next step S324, CPU 31 determines whether "end" has been designated by the user. When the user has not designated "end" (NO at step S324), the processing of steps S312 and et seq. is repeated. When "end" is designated by the user (YES at step S324), the processing of the third game ends.

Instead of displaying all the plurality of image data obtained by picking up an image when a predetermined condition is satisfied, the plurality of image data taken during the game may be sequentially obtained, and those satisfying a predetermined condition among the plurality of obtained image data may be extracted for display after the game is over.

Although the information included in the image data obtained by the image pick-up unit is directly used in the embodiment set forth above, image display may be provided with the amount of information per one pixel of the obtained image data reduced.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A non-transitory storage medium comprising a game program executed by a computer of a game device interacting with an image pick-up device and a display device, said image pick-up device configured to pick up an image of a user, the game program causing the computer to:

proceed a game based on facial features detected using facial recognition performed on a user's image included in pick-up image data obtained by said image pick-up device; and display an image based on display image data at said display device, said pick-up image data being obtained by said image pick-up device during processing of the game when said detected facial features from said user's image satisfies at least a first condition, wherein an image based on image data is displayed at said display device during a non-proceeding state of a game in accordance with said game proceeding, the displayed image represents the pick-up image data obtained by said image pick-up device during a game proceeding that precedes the non-proceeding state of the game.

2. The non-transitory storage medium storing the game program according to claim 1, wherein said pick-up image data being obtained by said image pick-up device when said user's image satisfies at least a second condition.

3. The non-transitory storage medium storing the game program according to claim 1, wherein the game program further causing the computer to display an image based on image data at said display device after said game is over, said pick-up image data being obtained by said image pick-up device when said user's image satisfies at least a second condition.

4. The non-transitory storage medium storing the game program according to claim 1, wherein the game program further causing the computer to determine whether said game has attained passing or not based on said user's image, and display an image based on image data at said display device, said pick-up image data being obtained by said image pick-up device when determination is made that at least said game has attained passing.

5. The non-transitory storage medium storing the game program according to claim 4, wherein the game program further causing the computer to determine whether said game has attained passing or not based on a position of said user's image and a position of an object displayed as a game effect.

6. The non-transitory storage medium storing the game program according to claim 5, wherein the game program further causing the computer to detect, as said user's image, a user's area indicating an area of a user within said image data, and determine whether said game has attained passing or not based on a position of an object displayed as said game effect and a position of said detected user's area.

7. The non-transitory storage medium storing the game program according to claim 6, wherein the game program further causing the computer to detect said user's area for each of image data repeatedly obtained for every cycle by said image pick-up device, and display said user's area detected during proceeding of said game.

8. The non-transitory storage medium storing the game program according to claim 7, wherein the game program further causing the computer to display said user's area in a manner different from an image picked-up by said image pick-up device.

9. The non-transitory storage medium storing the game program according to claim 6, wherein the game program further causing the computer to detect a skin tone area in said image data, and determine whether said game has attained passing or not based on a position of an object displayed as said game effect, and a position of said detected skin tone area.

10. The non-transitory storage medium storing the game program according to claim 9, wherein the game program further causing the computer to detect said skin tone area for each image data repeatedly obtained for every cycle by said image pick-up device, and display a skin tone area detected during proceeding of said game.

11. The non-transitory storage medium storing the game program according to claim 10, wherein the game program further causing the computer to display said skin tone area in a manner different from an image picked up by said image pick-up device.

12. The non-transitory storage medium storing the game program according to claim 4, wherein the game program further causing the computer to detect a presence of a user, and determine whether a game has attained passing or not during a period over which the presence of the user is detected.

13. The non-transitory storage medium storing the game program according to claim 1, wherein the game program further causing the computer to detect, as said user's image, a face area of a person in said image data, and determine whether a game has attained passing or not based on a position of an object displayed as a game effect and a position of a face area of a person detected.

14. The non-transitory storage medium storing the game program according to claim 1, wherein the game program further causing the computer to store said image data every time any of a plurality of different conditions is satisfied, said plurality of different conditions including conditions for determining that a relevant game has attained passing, from a start to an end of a game, and display, in a manner switched in a sequence, a plurality of said image data stored.

15. The non-transitory storage medium storing the game program according to claim 1, wherein the game program further causing the computer to display and overlay an object on an image based on said image data obtained by said image pick-up device.

16. The non-transitory storage medium storing the game program according to claim 15, wherein the game program further causing the computer to display and overlay an object corresponding to a game effect when said image data was stored, on an image based on relevant image data.

17. The non-transitory storage medium storing the game program according to claim 15, wherein the game program further causing the computer to display and overlay an object independent of a game effect when said image data was stored, on an image based on relevant image data.

18. The non-transitory storage medium storing the game program according to claim 15, wherein the game program further causing the computer to display an object at said display device, during proceeding of said game, and during display of an image based on image data obtained by said image pick-up device, and display at a location identical to the location of the object that was displayed during the game proceeding, another object replacing the displayed object, during display of an image based on image data obtained by said image pick-up device.

19. The non-transitory storage medium storing the game program according to claim 1, wherein the game program further causing the computer to display an object at said display device, during proceeding of said game, and during display of an image based on image data obtained by said image pick-up device, and display an object independent of the object that was displayed during the game proceeding, during display of an image based on image data obtained by said image pick-up device.

20. The non-transitory storage medium storing the game program according to claim 1, wherein the game program further causing the computer to determine, at a number of multiple phases, whether a game has attained passing or not based on a passing condition corresponding to each phase, and switch and display, at said display device, an object associated with a passing condition corresponding to each phase according to said game proceeding.

21. The non-transitory storage medium storing the game program according to claim 1, wherein the game program further causing the computer to determine, at a number of multiple phases, whether a game has attained passing or not based on a passing condition corresponding to each phase, and display synthesized images based on a plurality of image data obtained by said image pick-up device at each of said multiple phases during the game proceeding, and objects each associated with a passing condition corresponding to a phase at which image data was obtained.

22. The non-transitory storage medium storing the game program according to claim 1, wherein the game program further causing the computer to determine, at a number of multiple phases, whether a game has attained passing or not based on a passing condition corresponding to each phase, and display consecutively a plurality of image data obtained by said image pick-up device at each of said multiple phases during said game proceeding.

23. A game device comprising:
an image pick-up device configured to pick up an image of a user;
a display device; and
a processing system having at least one processor, the processing system configured to carry on a game based on facial features detected using facial recognition performed on a user's image included in pick-up image data obtained by said image pick-up device, and display an image based on display image data at said display device, said pick-up image data being obtained by said image pick-up device during processing of the game when said detected facial features from said user's image satisfies at least a first condition,
wherein said processing system is further configured to display an image based on image data at said display device during a non-proceeding state of a game in accordance with the game carrying on based on the user's image included in the pick-up image data, the displayed image represents the pick-up image data obtained by said image pick-up device during a game proceeding that precedes the non-proceeding state of the game.

24. A game processing system, comprising:
a display device configured to display image data; and
a game device operatively coupled to the display device and having an image pick-up device configured to pick up an image of a user and a processing system having at least one processor, the processing system configured to:
carry on a game based on facial features detected using facial recognition performed on a user's image included in pick-up image data obtained by said image pick-up device, and
display an image based on display image data at said display device, said pick-up image data being obtained by said image pick-up device during processing of the game when said detected facial features from said user's image satisfies at least a first condition, wherein said processing system is further configured to display an image based on image data at said display device during a non-proceeding state of a game in accordance with the game carrying on based on the user's image included in the pick-up image data, the displayed image represents the pick-up image data obtained by said image pick-up device during a game proceeding that precedes the non-proceeding state of the game.

25. A game processing method executed by a computer of a game device having one or more processors and interacting with an image pick-up device and a display device, said image pick-up device configured to pick up an image of a user, the method comprising:

proceeding a game based on facial features detected using facial recognition performed on a user's image included in pick-up image data obtained by said image pick-up device; and displaying, via the one or more processors, an image based on display image data at said display device, wherein said pick-up image data being obtained by said image pick-up device during processing of the game when said detected facial features from said user's image satisfies at least a first predetermined condition, and wherein an image is displayed based on image data at said display device during a non-proceeding state of the game in accordance with the game proceeding based on the user's image included in the pick-up image data, the displayed image represents the pick-up image data obtained by said image pick-up device during a game proceeding that precedes the non-proceeding state of the game.

26. A non-transitory storage medium storing a game program executed by a computer of a game device interacting with an image pick-up device and a display device, said image pick-up device configured to pick up an image of a user, the game program causing the computer to perform functionality comprising:

capturing an image using the image pick-up device during a proceeding state of a game;

performing image recognition of the captured image during the proceeding state of the game by detecting facial features based on the image recognition;

transitioning game processing to a non-proceeding state of the game when the detected facial features from the image recognition satisfies one or more conditions; and displaying the captured image, captured by the image pick-up device during the proceeding state of the game, during the non-proceeding state of the game.

27. A system, comprising:

an image capture device configured to capture an image of a user;

a display device operatively coupled to the image capture device; and a processing system operatively coupled to the image capture device and the display device and having at least one processor, the processing system configured to:

capture an image of the user during execution of a game, recognize one or more facial features of the user as the image of the user is captured during execution of the game, advance progress of the game based on interaction of the one or more recognized facial features of the user with one or more virtual game object, store one or more of the captured images of the user captured during gameplay, transition progress of the game to a non-proceeding state when one or more conditions related to the interaction of the one or more recognized facial features of the user with the one or more virtual game objects is satisfied, and replay the one or more of the captured images, when the game has transitioned to the non-proceeding state, by displaying the stored one or more images captured during execution of the game.

28. The system of claim 27, wherein the stored one or more images captured during execution of the game are displayed in conjunction with the one or more virtual game objects during replay of the movement of the user in free space.

* * * * *